US008654007B2

(12) United States Patent
Allam et al.

(10) Patent No.: US 8,654,007 B2
(45) Date of Patent: Feb. 18, 2014

(54) MULTI-TARGET DATA PROCESSING FOR MULTI-STATIC AND MULTI-CHANNEL PASSIVE RADARS

(75) Inventors: Sébastien Allam, Antony (FR); Emmanuel De Gramont, Paris (FR); Wilfried Greverie, Paris (FK); Jean-Claude Deltour, Fresnes (FR); Mathieu Klein, Gif sur Yvette (FR)

(73) Assignee: Thales (FR)

( * ) Notice: Subject to any disclaimer, the term of this patent is extended or adjusted under 35 U.S.C. 154(b) by 0 days.

(21) Appl. No.: 13/596,327

(22) Filed: Aug. 28, 2012

(65) Prior Publication Data

US 2013/0076558 A1 Mar. 28, 2013

Related U.S. Application Data

(63) Continuation of application No. 13/382,960, filed as application No. PCT/EP2009/058769 on Jul. 9, 2009, now abandoned.

(51) Int. Cl.
*G01S 13/00* (2006.01)

(52) U.S. Cl.
USPC .......................... 342/195; 342/107; 342/175

(58) Field of Classification Search
CPC ....... G01S 13/584; G01S 13/60; G01S 13/87; G01S 13/34
USPC ........................ 342/59, 89–90, 107–108, 463
See application file for complete search history.

(56) References Cited

U.S. PATENT DOCUMENTS

| 5,805,101 | A | * | 9/1998 | Bodenmueller et al. | ......... 342/41 |
| 6,995,705 | B2 | * | 2/2006 | Bradford et al. | ................. 342/95 |
| 7,009,554 | B1 | * | 3/2006 | Mookerjee et al. | ........... 342/195 |
| 7,719,461 | B1 | * | 5/2010 | Mookerjee et al. | ............. 342/95 |
| 2003/0048224 | A1 | | 3/2003 | Benner | |
| 2004/0075605 | A1 | | 4/2004 | Bradford | |
| 2004/0233105 | A1 | * | 11/2004 | Benner et al. | ................. 342/451 |
| 2006/0082490 | A1 | * | 4/2006 | Chen et al. | ..................... 342/52 |
| 2006/0132357 | A1 | * | 6/2006 | Pozgay et al. | ................ 342/174 |
| 2008/0136704 | A1 | * | 6/2008 | Chan et al. | .................... 342/201 |

FOREIGN PATENT DOCUMENTS

| FR | 2882442 | 8/2006 |
| WO | 2008071777 | 6/2008 |

OTHER PUBLICATIONS

Power, C.M.; Brown, D.E., "Context-based methods for track association," Information Fusion, 2002. Proceedings of the Fifth International Conference on , vol. 2, no., pp. 1134,1140 vol. 2, Jul. 8-11, 2002.*
International Preliminary Report on Patentability dated Feb. 7, 2012 in Application No. PCT/EP2009/058769.

(Continued)

*Primary Examiner* — John B Sotomayor
*Assistant Examiner* — Marcus Windrich
(74) *Attorney, Agent, or Firm* — Snell & Wilmer L.L.P.

(57) ABSTRACT

The present invention relates to the general field of radar tracking applied to multi-static radar systems. It consists of a method for coherently merging the individual tracks generated from the various bistatic bases that make up the system so as to generate and maintain global tracks so that an object detected by a single bistatic base is represented by the corresponding track and an object detected by a number of bistatic bases and giving rise to the creation of a number of individual tracks is represented only by a single global track.

14 Claims, 7 Drawing Sheets

(56) References Cited

OTHER PUBLICATIONS

Written Opinion dated Jan. 8, 2012 in Application No. PCT/EP2009/058769.
International Search Report for PCT/EP2009/058769 dated Jul. 9, 2009.
Howland, et al. "FM Radio Based Bistatic Radar—Passive Radar Systems", IEE Proceedings: Radar, Sonar & Navigation, Institution of Electrical Engineers, vol. 152, No. 3, Jun. 3, 2005.
Morabito et al., "Improved Computational Performance for Distributed Passive Radar Processing Through Channelised Data—Passive Radar Systems", IEE Proceedings: Radar, Sonar & Navigation, Institution of Electrical Engineers, vol. 152, No. 3, Jun. 3, 2005.

* cited by examiner

MULTI-TARGET DATA PROCESSING FOR MULTI-STATIC AND MULTI-CHANNEL PASSIVE RADARS

CROSS-REFERENCE TO RELATED APPLICATIONS

This application is a continuation of, claims priority to and the benefit of, U.S. Ser. No. 13/382,960, entitled "MULTI-TARGET DATA PROCESSING FOR MULTI-STATIC AND MULTI-CHANNEL PASSIVE RADARS" filed on Jan. 9, 2012. The '960 application is a U.S. national phase filing under 35 U.S.C.§371 of PCT/EP2009/058769, filed on Jul. 9, 2009, both of which are incorporated herein by reference.

FIELD OF THE INVENTION

The present invention relates to the field of radar tracking and, in particular, the field of multi-static systems implementing a passive radar and a number of utility transmitters forming, with this radar, various bistatic bases. It relates more particularly to systems comprising passive radars with a number of reception channels.

BACKGROUND OF THE INVENTION

When a given geographic area is provided with radar coverage using a passive radar, the main problem that presents itself consists of the difficulty that is encountered in jointly using the information generated from the received signals, bearing in mind that these signals may originate from one or other of the utility transmitters, the transmissions of which partially or totally cover the area observed by the radar.

Generally, this information is embodied, as is known, in the form of tracks which show the progression in the space observed of the objects of interest detected by the radar.

Also generally, the tracks generated by the radar are maintained by the blips supplied periodically by the radar concerned. A blip represents the information extracted from the received signals. This information comprises in particular the speed and position information concerning, for a given measurement instant, the characteristics of an object detected by this radar. All the successive blips formed over time for one and the same detected object are thus used to form and maintain the track itself, a track being able to be analyzed manually via a display system, or automatically. In this way, at each measurement instant, the radar receives signals emanating from one or other of the utility transmitters, each transmitter transmitting on a frequency band that is generally distinct. This band is also likely to consist of a number of separate subbands, or channels, operated simultaneously by the transmitter. In such a case, the receiver of the radar forms a number of reception channels that is appropriate to the reception of all the channels covered by all the transmitters.

As is known, the radar then separately processes the signal received on each channel and generates, for each channel, and for each object detected, a blip which is associated, as appropriate, with the blips relating to the same object and generated at the preceding measurement instants. The succession of the blips forms the track relating to the object detected for the channel concerned.

Consequently, one and the same object located in a portion of the space covered by the transmissions of a number of utility transmitters may be detected by the radar on a number of reception channels. Thus, by combining the information generated from the various reception channels, it is possible to refine the determination of the parameters characterizing the object detected.

A correct management of the space therefore consists in particular in detecting the tracks corresponding to one and the same object and in associating these tracks to benefit from their complementarity in terms of information.

However, the combination of these various observations is not immediate. In fact, the passive radar forms, with each utility transmitter, a bistatic base that is independent of the other bases, and the information generated, notably the position and speed information, is referenced in the "transmitter-radar" coordinate system associated with this base. Consequently, to be able to jointly exploit the information generated by each of the bistatic bases and relating to one and the same object, it is necessary to determine which of the available information can be attributed to this same object and can consequently be associated.

The general problem that is posed therefore consists in finding a means of automatically making the association of the bistatic blips delivered on the various reception channels, and/or various bistatic bases, which correspond to one and the same object, and of providing the radar management member with a set of global tracks in which each track represents a various object.

SUMMARY OF THE INVENTION

One aim of the invention is to resolve this problem to be able to produce detection systems formed by passive radars which exploit transmissions emanating from the utility transmitters and that can cover the detection area concerned.

To this end, the subject of the invention is a tracking method for multi-static and multi-channel radar systems, a method which creates global merged tracks by associating the individual blips generated by the various reception channels of the various bistatic bases that make up the system. The method comprises:

a first upstream merging step for generating, for each bistatic base, merged blips by associating individual blips relating to one and the same target, generated over time by the various reception channels of the bistatic base concerned. The merged blips produced are associated over time to form individual tracks. Each individual track characterizes the trend of a given target;

a second downstream merging step for generating global tracks by associating the merged blips that make up the individual tracks generated on the various bistatic bases and relating to one and the same target, by merging the measurements forming the various merged blips to form global measurements used as observation vectors to maintain the global tracks formed. In this way, each object detected is represented only by a single global track.

According to the invention, each merged blip j being characterized by a measurement vector $y_j = (r_b, v_b, \theta)$, the first upstream merging step implements an operation to form individual tracks which itself comprises, for each measurement instant:

a first blip merging step which associates the individual blips of the various reception channels of each bistatic base and which forms merged blips. The individual blips exhibit, for a given measurement instant, measurement vectors $y_j$ dose to one another;

a second step for constructing individual tracks from the merged blips, an individual track being formed by the succession over time of the merged blips relating to one and the same target.

According to the invention, the blip merging step itself comprises the following modules:

a first blip aggregation module which associates the individual blips of the various reception channels of each bistatic base which exhibit, for a given measurement instant, measurement vectors $y_j$ that are dose to one another and forms merged blips, a second module for merging the aggregated individual blips which generates, for each aggregate, a single resultant measurement vector y forming a merged blip. This measurement vector is made up from the measurement vectors $y_j$ of the aggregated individual blips, the merged blip being used to form a given individual track, a third module for checking the state of the individual tracks formed, which determines the likelihood of the individual track concerned on the basis of the number of individual blips forming the aggregate from which the merged blips forming the track originate.

According to the invention, the first blip aggregation module associates the individual blips j, the measurement vectors $y_j$ of which satisfy the proximity criterion consisting of the following three simultaneous equalities:

$$\left[r_b^{p1} - 2\sigma_{r_b^{p1}}; r_b^{p1} + 2\sigma_{r_b^{p1}}\right] \cap \left[r_b^{p2} - 2\sigma_{r_b^{p2}}; r_b^{p2} + 2\sigma_{r_b^{p2}}\right] \neq \emptyset$$

and $$\left[v_b^{p1} - 2\sigma_{v_b^{p1}}; v_b^{p1} + 2\sigma_{v_b^{p1}}\right] \cap \left[v_b^{p2} - 2\sigma_{v_b^{p2}}; v_b^{p2} + 2\sigma_{v_b^{p2}}\right] \neq \emptyset$$

and $$\left[\theta^{p1} - 2\sigma_{\theta p1}; \theta^{p1} + 2\sigma_{\theta p1}\right] \cap \left[\theta^{p2} - 2\sigma_{\theta p2}; \theta^{p2} + 2\sigma_{\theta p2}\right] \neq \emptyset$$

According to the invention, the second merging module generates, for each aggregate, a measurement vector $y(r_b, v_b, az)$ from the measurement vectors $y_j(r_b, v_b, az)$ of the blips forming the aggregate. y is defined by the following equalities:

$$y = R \sum_{j=1}^{N} R_j^{-1} y_j \text{ and } R = \left(\sum_{j=1}^{N} R_j^{-1}\right)^{-1}$$

in which $R_j$ represents the covariance matrix associated with the measurement vector $y_j$.

According to the invention, the second downstream merging step cyclically implements, for each measurement instant, the following processing modules:

a module for initializing new global tracks from the individual tracks not yet associated deriving from the various bistatic bases;

a module for associating the individual tracks with the global tracks already formed, the association being made if, for the instant concerned, the measurement vector y associated with the individual track is statistically close to the predicted observation vector representing the state of the global track for that instant;

a locating module merging the bistatic distance measurements deriving from the individual tracks contributing to the global tracks;

a tracking module implementing an extended Kalman filter;

a management module, responsible for sequencing the other modules and managing the state of the global tracks formed to determine the likelihood of the existing global tracks and for continuing or stopping the maintaining of these tracks. The decision to continue or stop is dependent on the number of merged blips associated with this global track at each of the measurement instants and on the variation of this number over time.

According to the invention, the module for initializing new global tracks comprises five steps:

a first step which tests the azimuth consistency of the candidate individual tracks;

a second step which tests the distance consistency of the candidate individual tracks;

a third step which tests the speed consistency of the candidate individual tracks;

a fourth step which proceeds with the initialization of a global track;

a fifth step which consists in aggregating, with the initialized global track, individual tracks coming from the bistatic bases not involved in the initialization of the global track.

According to the invention, the locating module of the second step defines the zone of intersection of the location ellipsoids as a juxtaposition of blocks, and exploits the characteristics to represent the position of the target, by a mean value and a covariance matrix.

According to the invention, the modules for initializing new global tracks and associating individual tracks with the global tracks already formed implement the calculation of the statistical distance γ separating a global track i and an individual track j of a bistatic base b. The calculation of γ is performed on the basis of the bistatic distance, bistatic speed and azimuth components deriving from the association-candidate individual track and the projection y of the state x of the global track in the bistatic base of the candidate individual track.

According to the invention, the tracking module proceeds, for each measurement instant k, with the prediction $\tilde{x}_k$ of the components of the state vector x corresponding to each global track based on the estimation $\hat{x}_{k-1}$ of the components of the state vector x at the instant k−1. This estimation is itself performed on the basis of the observation vector $y_{k-1}$ generated by means of the measurements relating, for the instant k−1, to the individual tracks associated with the global track concerned and the prediction $\tilde{x}_{k-1}$ of the components of the state vector x at the instant k−1. The components of the observation vector consist of the result of the merging of the bistatic distances of each individual track, generated in the locating module for the global tracks of the downstream merging step and for the bistatic speeds of the same individual tracks obtained on completion of the upstream merging step.

According to the invention, the tracking module determines the estimation $\hat{x}_k$ and the prediction $\tilde{x}_k$ of the observation vector x by means of an extended Kalman filter.

The method according to the invention advantageously makes it possible to resolve the problem of multi-target tracking for multi-channel passive radars, working simultaneously with a number of utility transmitters. It advantageously makes it possible to merge the detection information relating to one and the same object and generated from signals emanating from various utility transmitters, the merging making it possible to produce a clear representation of the aerial situation around the radar.

BRIEF DESCRIPTION OF THE DRAWINGS

The features and advantages of the invention will be better appreciated from the following description, this description being based on the appended figures which represent.

MORE DETAILED DESCRIPTION

Figure 1:
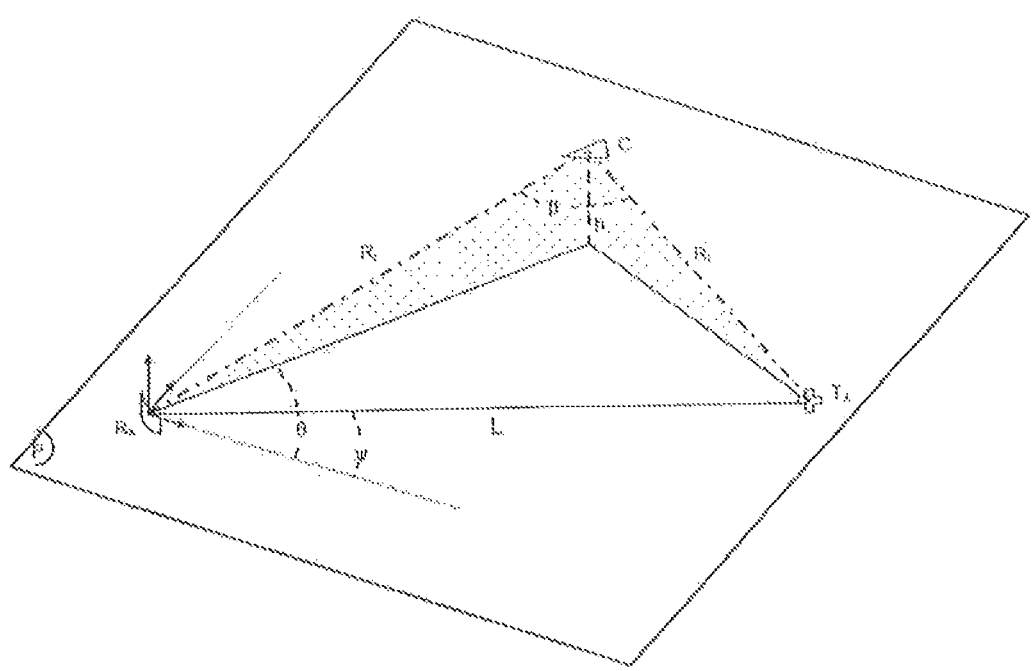
FIG. 1, a schematic representation of a bistatic radar base.

In order to assist in reading the description of the invention, some of the concepts relating to bistatic radars, and the nature of the measurements performed by this radar family, are first of all reviewed. FIG. 1 shows the geometry of such a device.

The processing applied to the signal, implemented by a bistatic radar, makes it possible to simultaneously measure, by means of a distance/Doppler analysis, the delay and the frequency offset between the signal transmitted by the transmitter and the signal reflected by the detected object C, or target. The delay is uniform with the bistatic distance defined by the equality $r_b = R_T + R_R$ and the frequency offset is uniform with the bistatic speed defined by the equality $v_b = \dot{R}_T + \dot{R}_R$. This processing operation also returns an estimate of the angle $\theta$ of arrival of the signal reflected by the target C.

Since each of these three measurements ($r_b$, $v_b$ and $\theta$), which form the components of a measurement vector $y = [r_b \; v_b \; \theta]'$, is in principle potentially affected by an error, an accuracy $\sigma$ is attached to each of them. The information produced by the processing of the signal is therefore:

the bistatic distance: $(r_b, \sigma_{r_b})$,
the bistatic speed: $(v_b, \sigma_{v_b})$,
the azimuth: $(\theta, \sigma_\theta)$.

The bistatic distance $r_b$ corresponds, by definition, to the sum of the transmitter-target path $R_T$ and the target-receiver path $R_R$. It is associated with the position $X^t$ of the target by the following equality:

$$r_b = R_T + R_R = \|X^t - X^{T_x}\|_2 + \|X^t - X^{R_x}\|_2 \qquad [1]$$

in which:
$X^{T_x} = [x^{T_x} y^{T_x} z^{T_x}]'$ is the position vector of the transmitter,
$X^{R_x} = [x^{R_x} y^{R_x} z^{R_x}]'$ is the position vector of the receiver, and
$X^t = [x^t y^t z^t]'$ the position vector of the detected object (or target) at the instant t.

(It will be recalled that the quantity M' designates the transpose of the quantity M).

The reference coordinate system used for the measurement of the components of the various vectors is here, as represented in FIG. 1, the Cartesian coordinate system ($R_x$, x, y, z), centered on the receiver and in which the axis z represents the altitude.

The bistatic speed $v_b$ corresponds, as is known, to the derivative of the bistatic distance $r_b$. It is defined by the following equality:

$$v_b = \dot{R}_T + \dot{R}_R = \frac{(X^t - X^{T_x}) \cdot v^t}{\|X^t - X^{T_x}\|_2} + \frac{(X^t - X^{R_x}) \cdot v^t}{\|X^t - X^{R_x}\|_2} \qquad [2]$$

in which $v^t = [v_x^t \; v_y^t \; v_z^t]'$ is the speed vector of the detected object (i.e. the target), at the instant t, in the reference coordinate system.

The azimuth of the detected object is expressed as follows:

$$\theta = \operatorname{atan}\left(\frac{y^t - y^{R_x}}{x^t - x^{R_x}}\right) \qquad [3]$$

Each measured component is, in principle, affected by an error which can be modeled by a centered Gaussian additive noise of covariance matrix R. The errors on each of the components are here considered to be independent of one another, so that the covariance matrix of the measurement noise is a diagonal matrix, constructed from the measurement accuracies supplied by the processing of the signal and defined as follows:

$$R = \begin{pmatrix} \sigma_{r_b}^2 & 0 & 0 \\ 0 & \sigma_{v_b}^2 & 0 \\ 0 & 0 & \sigma_\theta^2 \end{pmatrix} \qquad [4]$$

Given that there are a number of utility transmitters to cover the observed space, it is also possible to form a number of bistatic bases with one and the same passive radar. In this case, one and the same target moving in the space covered can be characterized by a number of bistatic distance measurements ($r_b^1, r_b^2, \ldots, r_b^n$) and bistatic speed measurements ($v_b^1, v_b^2, \ldots, v_b^n$); each measurement being referenced in one of the bistatic bases formed and the measurements on the various reception channels being performed simultaneously.

Figure 2:
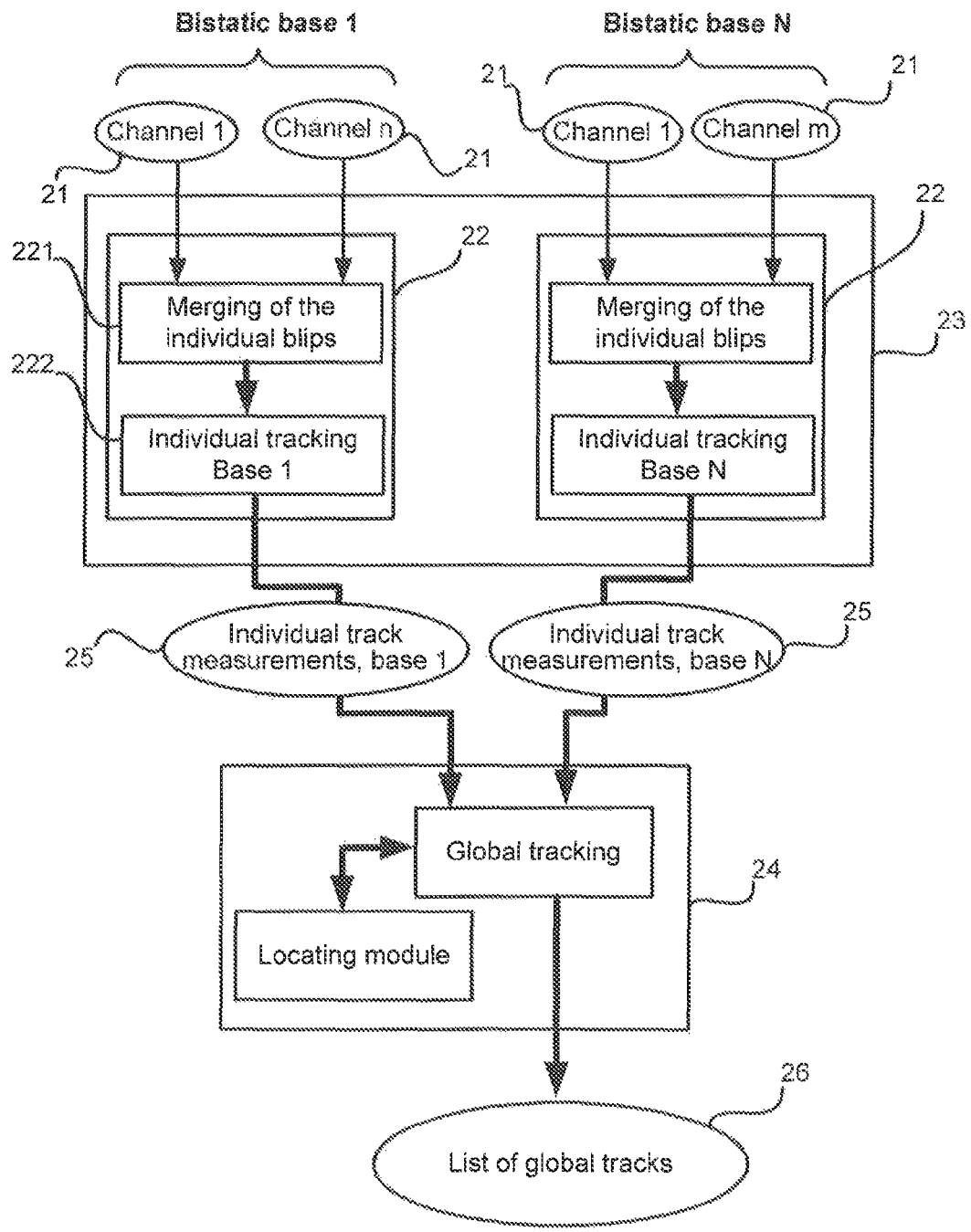
FIG. 2, a general block diagram of the method according to the invention.

FIG. 2 shows a general block diagram of the method according to the invention as it can be implemented by a multi-static passive radar exploiting the transmissions of a number of utility transmitters. The radar here forms, with each transmitter, a specific bistatic base. As this figure illustrates, the method according to the invention comprises two main steps:

a first upstream merging step 23 for forming, for each bistatic base, a set of individual tracks; each individual track resulting from the application of an operation 22 for merging the individual blips generated on the various reception channels 21 of one and the same bistatic base and relating to one and the same detected object;

a second downstream merging step 24 for forming global tracks 26, each global track being constructed by merging the individual tracks 25 supplied by the various bistatic bases and relating to one and the same target.

In this way, the method according to the invention processes the blips generated in two stages, a first stage during which each bistatic base is considered separately, the individual blips generated from the various reception channels 21 being grouped together to form merged blips used to form individual tracks, and a second stage during which the individual tracks generated by various bistatic bases are associated to form global tracks, each global track corresponding to a various detected object.

Figure 3:
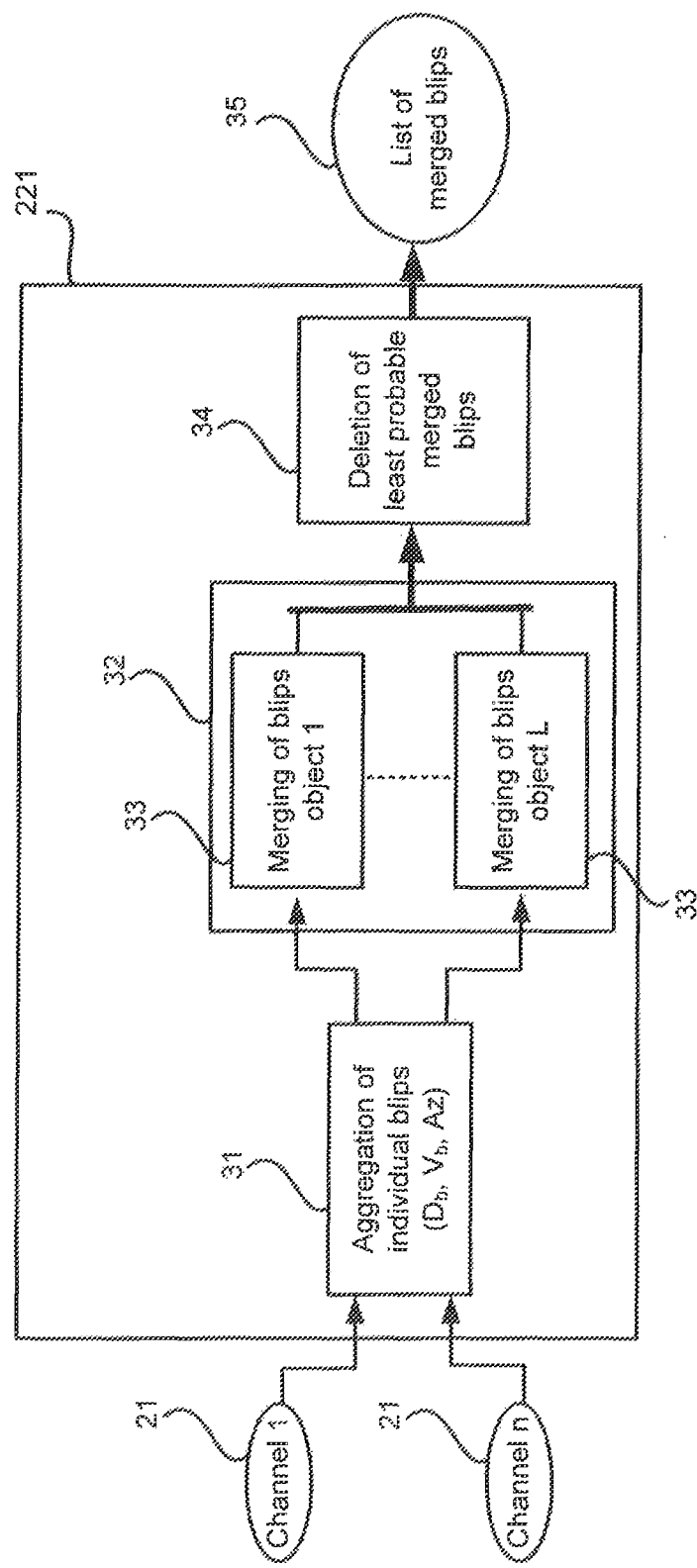
FIG. 3, a general block diagram of the step for creating merged blips from individual blips.
Figure 4:
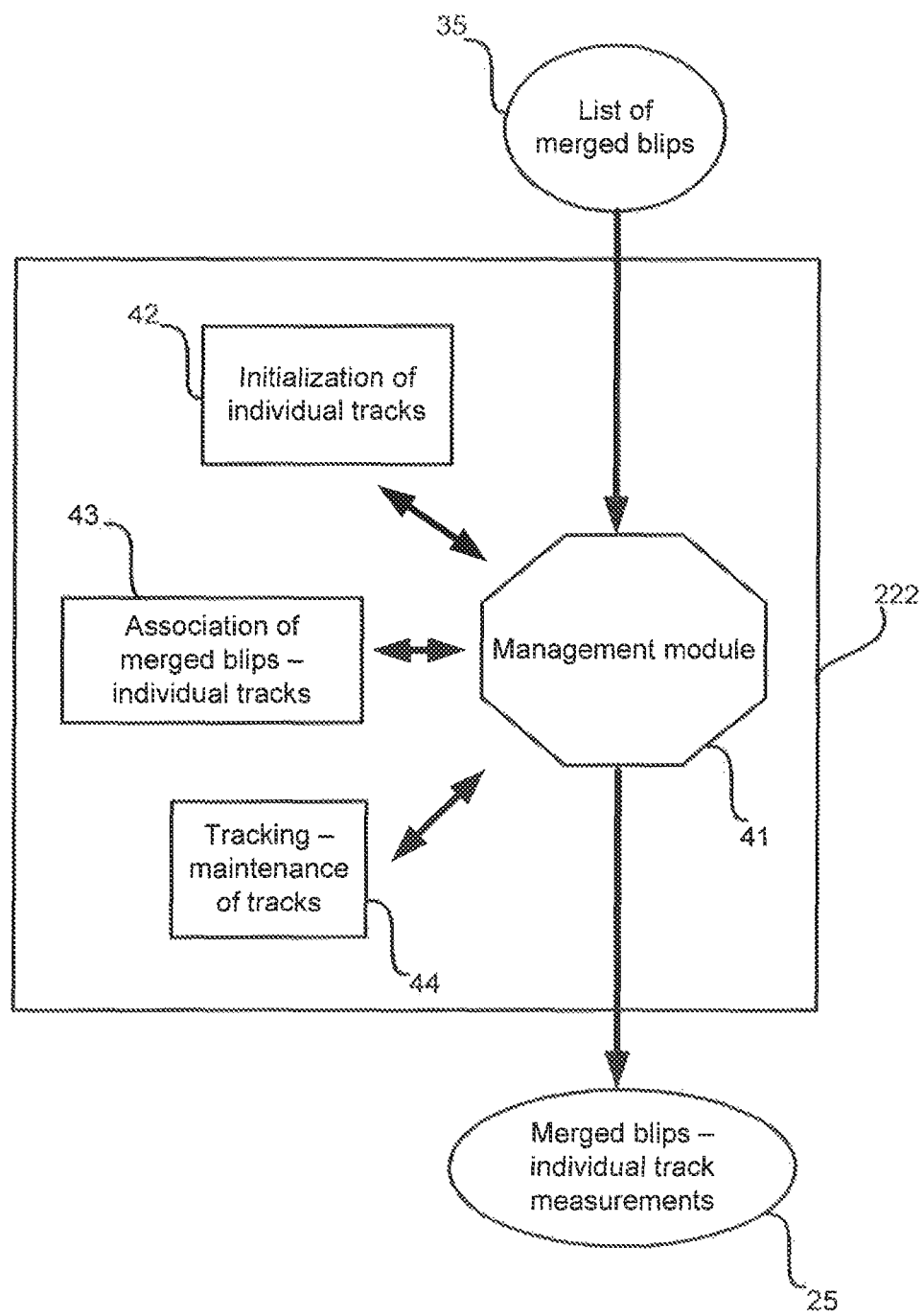
FIG. 4, a block diagram of the step for forming individual tracks.
Figure 5:
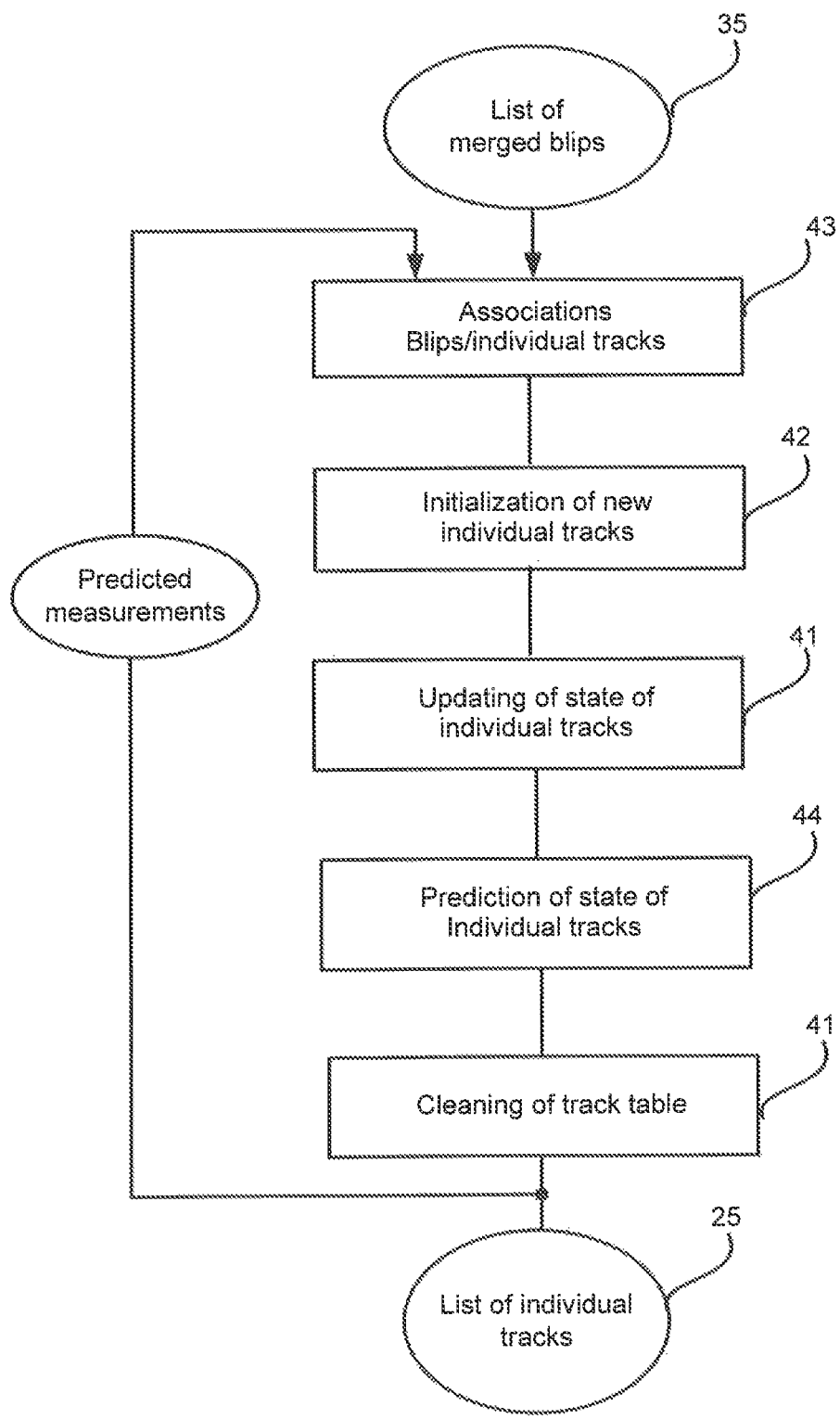
FIG. 5, a block diagram of the sequencing of the step for forming individual tracks.

FIGS. 3, 4 and 5 are then considered, which illustrate the operating principle of the main step 23 of the method according to the invention, the so-called "upstream merging" step. The object of this step is to merge the measurements originating from a number of distinct frequency channels and deriving from one and the same transmitter (or, by default, colocated transmitters). This merging step, performed on all three components of the observation vector ($r_b$, $v_b$, $\theta$) characterizing the target, is possible because the measurements forming the blips extracted from the signals originating from these channels are derived from the same bistatic base and are therefore constructed from the observation, at a given instant, of one and the same aerial situation. It advantageously enhances the accuracy of the observation of a target having responded simultaneously on a number of channels of one and the same bistatic base.

As FIG. 2 illustrates, the upstream merging step 23 processes each bistatic base separately from the others to form individual tracks from the individual blips generated by the various reception channels that the bistatic base concerned comprises. To this end, it first implements, for each bistatic base, an individual tracking operation 22 which in turn breaks down into two successive operations:

a first operation 221 for forming merged blips from the individual blips generated on each reception channel.

a second tracking operation 222 for forming individual tracks by associating over time the merged blips generated over time and relating to one and the same target.

The operation 221 for forming the merged blips is in turn, as FIG. 3 illustrates, executed in three steps:

a first aggregation module 31, consisting in grouping together the individual blips formed on the various channels 21 to produce aggregates, an aggregate consisting of blips exhibiting characteristics that are close and probably relative to one and the same target.

a second module 32 for merging the measurements that make up the aggregated individual blips, so as to form merged blips.

a third module for eliminating the merged blips generated and for which the reality is improbable.

The aggregation algorithm according to the invention, implemented by the module 31, searches through all the individual blips generated from the signals of the various reception channels of one and the same bistatic base to find those that can be associated on the basis of the following proximity criterion:

Two blips (p1, p2) are considered to have to be associated if the following three equalities are simultaneously satisfied:

$$\begin{cases} \left[ r_b^{p1} - 2\sigma_{r_b^{p1}}; r_b^{p1} + 2\sigma_{r_b^{p1}} \right] \cap \left[ r_b^{p2} - 2\sigma_{r_b^{p2}}; r_b^{p2} + 2\sigma_{r_b^{p2}} \right] \neq \emptyset \\ \left[ v_b^{p1} - 2\sigma_{v_b^{p1}}; v_b^{p1} + 2\sigma_{v_b^{p1}} \right] \cap \left[ v_b^{p2} - 2\sigma_{v_b^{p2}}; v_b^{p2} + 2\sigma_{v_b^{p2}} \right] \neq \emptyset \\ \left[ \theta^{p1} - 2\sigma_{\theta p1}; \theta^{p1} + 2\sigma_{\theta p1} \right] \cap \left[ \theta^{p2} - 2\sigma_{\theta p2}; \theta^{p2} + 2\sigma_{\theta p2} \right] \neq \emptyset \end{cases} \quad [5]''$$

It should be noted that the validity of this association criterion relies only on the accuracy of each component of the measurement vector associated with the blip concerned. If it is also assumed that the measurement noise is independent and centered Gaussian, the association of individual blips based on this criterion amounts, as is known, to opening association windows corresponding to a confidence interval of 95%.

The merging technique implemented by the module 32 consists in associating a pseudo-measurement with each merged blip obtained. This pseudo-measurement is determined on the basis of the measurements ($y_j, R_j$) corresponding to the K aggregated individual blips, by calculating (operation 33) the following weighted sum:

$$y = R \sum_{j=1}^{K} R_j^{-1} y_j \qquad [6]$$

In which R is the matrix defined by:

$$R = \left( \sum_{j=1}^{K} R_j^{-1} \right)^{-1} \qquad [7]$$

The use of this merging rule advantageously makes it possible to take account of the relative accuracies of the associated measurements. Thus, the more inaccurate a measurement is, the less it contributes to generating the merged measurement.

The module 32 therefore supplies, for each detected target and for each bistatic base, a synthetic measurement deriving from the measurements forming the individual blips generated from signals received on the various channels 21. At this stage, the concept of reception channel disappears in favor of the concept of bistatic base. Each bistatic base, that is to say, each base consisting of the radar receiver $R_x$ and a given utility transmitter $T_{xj}$, supplies, for each measurement instant, a set of merged blips each corresponding to a potential target.

However, to limit the number of blips and retain only the blips that are relevant, the method according to the invention advantageously includes an additional module 34 which attributes a score to each of the merged blips produced by the module 32. According to the invention, the score attributed to a merged blip is equal to the number of reception channels for which the corresponding target has been detected. Consequently, the rule for accepting or rejecting the blips is defined as follows:

for a number of channels equal to 2, all the blips, including the individual blips that could not be merged with other blips, are retained.

for a number of channels n greater than 2, only the merged blips having achieved a score of n-p are retained. The term p is here a parameter that can be adjusted to take account of the power of the transmitter concerned, and the desired false alarm ratio.

Thus, the module 34 produces, for each discretized measurement instant k, a list of merged blips 35 which will be used to generate individual tracks.

The object of the tracking operation 222 presented in FIG. 2 is to search for the presence of targets in the data deriving from one and the same bistatic base. For this, the merged blips 35 that may represent one and the same target are associated over time. This operation 222 advantageously makes it possible:

to eliminate the residual false alarm (and, because of this, to transmit to the downstream merging stage only the relevant information);

to compensate, by prediction, for a temporary lack of merged blip to maintain a track;

to smooth the measurements through a dynamic model and thus avoid the aberrant data.

It will be recalled here that a blip can be considered to be all the values at the instant k concerned, of the measurement parameters relating to a detected target. Consequently, the state at the instant k of the individual track associated with embodying the movement of the target concerned is defined by the value of the state vector associated with this track, a vector whose components are the bistatic distance, speed and acceleration, as well as the azimuth and its derivative. This track is maintained after analysis of the information deriving from the merged blip which is associated with it at this instant.

As FIG. 4 illustrates, this operation is performed by iteratively implementing, for each measurement instant k, the following processing modules:
- a management module 41 responsible for overall sequencing and orchestrating the other processing modules,
- a module 42 for initializing individual tracks;
- a data association module 43, responsible for identifying the most likely associations among the merged blips formed and the current individual tracks;
- an actual tracking module 44, performing the filtering and prediction functions used in particular to predict the value taken by a given individual track at the future measurement instant.

The sequencing performed by the management module 41 is illustrated by FIG. 5. It consists in linking together the tasks performed by the other modules at the rate of appearance of the merged blips, the merged blips generated at a given instant k being used to initialize new individual tracks or to maintain (prolong) the already existing individual tracks.

According to the invention, the management module 41 is also responsible for generating and updating the state of the individual tracks formed. To this end, it proceeds to attribute a score (a likelihood level) to the individual tracks and to eliminate the least probable tracks. To this end, it implements the following rules:
- a starting score is attributed to each track. This score is proportional to the number of frequency channels from which the merged blip used to initialize the track concerned was generated.
- the initial score attributed changes with the number of channels from which the merged blip obtained at the current instant k is generated and decreases when the maintaining of the track is performed in prediction mode, the prediction mode being implemented from the instant at which no merged blip can be used to maintain the track concerned. Beyond a defined number of operating cycles in prediction mode, the predicted individual track is closed and its identification number is freed up so as to be able to be reattributed to a new individual track.

According to a particular implementation, the score may be assigned a penalizing factor, in particular, for example, if difficulties occurred in the association phase (difficulties in taking an association decision). This last mechanism advantageously makes it possible to have a picture of the confidence to be placed in the reality of the corresponding track.

Also according to the invention, the function of the data association module 43 is to search for the correspondences between the new observations (i.e. the new merged blips) obtained at an instant K and the current individual tracks. These current tracks have been established on the basis of the merged blips generated at the preceding measurement instants. The association method retained is derived from the method known as the "closest neighbors method". Its principle is based on the use of an association criterion that makes it possible to restrict the tree of the association hypotheses to the most probable hypothesis.

The association criterion is based on a statistical distance measurement between the observations predicted for an instant k (predicted merged blips) by the tracking module 44 for the individual tracks currently being maintained and the observations, that is to say, the merged blips actually available at the instant k.

In other words, if the situation at an instant k is considered, at which there are $n_t$ tracks maintained and $n_y$ observations ($n_y$ merged blips) available, and if the $j^{th}$ observation (the $j^{th}$ merged blip) and its covariance are considered ($y_k^j, R_k^j$), as well as $$(\tilde{x}_k^t, \tilde{\Sigma}_{x_k^t})$$

the estimate of the state of the $t^{th}$ track and its covariance, the association principle that is followed consists in calculating, for all the combinations (t,j), a distance $d_k^{t,j}$, consistent with the likelihood of the predicted measurement t, knowing the observation j ($E[y_k^j|x_k^t]$).

This statistical distance is obtained by calculating the innovation of the track t; subject to a measurement vector $y_k^j$ hypothesis, it is expressed as follows:

$$d_k^{t,j} = (i_k^{t,j})' \Sigma_{i_k^{t,j}}^{-1} i_k^{t,j} \qquad [8]$$

In which the Innovation $i_k^{t,j}$ is expressed as follows:

$$i_k^{t,j} = y_k^j - H\tilde{x}_k^t \qquad [9]$$

and the Covariance of the innovation $$\Sigma_{i_k^{t,j}}$$

is expressed as follows:

$$\Sigma_{i_k^{t,j}} = H\tilde{\Sigma}_{x_k^t} H' + R_k^j \qquad [10]$$

The matrix H, which represents the transition matrix from the track state vector to the measurements vector, is the matrix defined by the following equality:

$$H = \begin{pmatrix} 1 & 0 & 0 & 0 & 0 \\ 0 & 1 & 0 & 0 & 0 \\ 0 & 0 & 0 & 1 & 0 \end{pmatrix} \qquad [11]$$

In this way, an observation j is considered, according to the invention, to be able to be associated with a track t when $d_k^{t,j}$ is below a threshold γ defined by a probability of good association and a $\chi^2$ law with 3 degrees of freedom.

The calculation over all the combinations (t,j) also makes it possible to construct an association matrix $\Omega_k = \{d_k^{t,j} | t \in [1,n_t], j \in [1,n_y]\}$.

Consequently, the closest neighbors approach consists in retaining, for a track t, only the association with the observation $\hat{j}_t$ that satisfies the following equality:

$$\hat{j}_t = \underset{j \in [1, n_y]}{\operatorname{argmin}}(d_k^{t,j} \leq \gamma) \quad [12]$$

Again according to the invention, the module 42 for initializing the individual tracks proceeds on the basis of two successive merged blips, $p_{k-1}$ and $p_k$, that can be attributed to one and the same target and that are not yet associated with a maintained track.

Contrary to the preceding paragraph, in the initialization phase, there is no measurement prediction available, since the track to be formed does not yet exist. Consequently, to decide whether two blips $(p_k, p_{k-1})$ originate from the same target and can therefore form an independent individual track, the method according to the invention implements a three-step heuristic approach which is described as follows:

First step: the blips formed at the instant k−1 (discretized instant) and that are not associated with individual tracks have a propagation function applied to them which defines these blips at the instant k as follows (the propagation is done on the nominal value and the uncertainty of the components):

$$\begin{cases} \tilde{r}_b^{p_k} = r_b^{p_{k-1}} + v_b^{p_{k-1}}(t_k - t_{k-1}) \\ \tilde{v}_b^{p_k} = v_b^{p_{k-1}} \\ \tilde{\theta}^{p_k} = \theta^{p_{k-1}} \end{cases} \quad [13]$$

and $$\begin{cases} \sigma_{\tilde{r}_b^{p_k}} = \sqrt{\sigma_{r_b^{p_{k-1}}}^2 + (t_k - t_{k-1})^2 \cdot \sigma_{v_b^{p_{k-1}}}^2 + (t_k - t_{k-1})^5 \cdot \sigma_\gamma^2/20} \\ \sigma_{\tilde{v}_b^{p_k}} = \sqrt{\sigma_{v_b^{p_{k-1}}}^2 + (t_k - t_{k-1})^3 \cdot \sigma_\gamma^2/3} \\ \sigma_{\tilde{\theta}^{p_k}} = \sqrt{\sigma_{\theta^{p_{k-1}}}^2 + (t_k - t_{k-1})^3 \cdot \sigma_\omega^2/3} \end{cases} \quad [14]$$

in which $\sigma_\gamma$ and $\sigma_\omega$ are constants associated with the model noise of the target.

Second step: identification of the compatible blips.

According to the invention, two blips are declared compatible if the following three inequalities are satisfied:

$$\begin{cases} |r_b^{p_k} - \tilde{r}_b^{p_k}| \leq 3 \cdot (\sigma_{r_b^{p_k}} + \sigma_{\tilde{r}_b^{p_k}}) \\ |v_b^{p_k} - \tilde{v}_b^{p_k}| \leq \Delta v_b \\ |\theta^{p_k} - \tilde{\theta}^{p_k}| \leq 3 \cdot (\sigma_{\theta^{p_k}} + \sigma_{\tilde{\theta}^{p_k}}) \end{cases} \quad [15]$$

It will be noted here that, since the speed component $v_b$ can be determined accurately by the radar and that a target even in rectilinear flight, sees its bistatic speed vary, the method according to the invention, to be able to find successive blips to be associated, uses a relatively wide chaining window ($\Delta v_b$) on the speed axis. Without this, no new track could be opened.

Third step: actual initialization of a track.

Opening a new individual track consists, for the initialization module 42, in defining its initial state. According to the invention, this state is considered to be Gaussian and therefore totally described by its first two moments. According to the method of the invention, the initialization is calculated as follows:

$$x^{init} = \begin{bmatrix} r_b^{init} \\ v_b^{init} \\ y_b^{init} \\ \theta^{init} \\ \omega^{init} \end{bmatrix} = \begin{bmatrix} r_b^{p_k} \\ v_b^{p_k} \\ (v_b^{p_k} - v_b^{p_{k-1}})/(t_k - t_{k-1}) \\ \theta^{p_k} \\ (\theta^{p_k} - \theta^{p_{k-1}})/(t_k - t_{k-1}) \end{bmatrix} \quad [16]$$

and $$\Sigma_{x^{init}} = \begin{pmatrix} \sigma_{r_b^{p_k}}^2 & 0 & 0 & 0 & 0 \\ 0 & \sigma_{v_b^{p_k}}^2 & 0 & 0 & 0 \\ 0 & 0 & \sigma_{y_b^{init}}^2 & 0 & 0 \\ 0 & 0 & 0 & \sigma_{\theta^{p_k}}^2 & 0 \\ 0 & 0 & 0 & 0 & \sigma_{\omega_b^{init}}^2 \end{pmatrix} \quad [17]$$

in which $$\sigma_{y_b^{init}}^2 \text{ and } \sigma_{\omega_b^{init}}^2$$

are constants set to make it possible to follow, without loss of filter synchronization, the fastest targets to be tracked.

It should be noted that by proceeding in this way, the initialization module can proceed to create a number of individual tracks from one and the same blip $p_k$ at the instant k. The initialization can therefore result in an overabundance of tracks. However, the individual tracks not maintained by subsequent merged blips will disappear over time because of the reduction in their score.

As for the tracking module 44, its purpose is to establish an estimation (in light of the theory of the estimation in discrete time) of the state x of the target (state variable of the system) through a dynamic model and an observation model. It is based, according to the invention, on the use of a discrete time Kalman filter, the inputs/outputs of which are defined as follows: the state variable is here the state of movement of the target concerned, a state modeled by a random process $\{x_k\}$ with value in $R^5$, the components of which are: $\lfloor r_{b,k} \ V_{b,k} \ \gamma_{b,k} \ \theta_k \ \omega_k \rfloor$ and in which $r_{b,k}$, $v_{b,k}$, $\gamma_{b,k}$, $\theta_k$ and $\omega_k$ respectively represent the bistatic distance [m], the bistatic speed [mis], the bistatic acceleration [m/s/s], the azimuth of the target seen from the receiver [rad] and the angular speed of the azimuth of the target [rad/s], the trend of the dynamic range of the target is represented as is known by the following discrete time linear system:

$$x_k = F x_{k-1} + w_k \quad [18]$$

in which the process $\{w_k\}$ is a centered Gaussian white noise, of covariance matrix Q assumed to be unchanging in time.

If T is used to denote the sampling pitch, that is to say, the time period separating two measurement instants, F and Q also respectively have as known expressions:

$$F = \begin{pmatrix} 1 & T & T^2/2 & 0 & 0 \\ 0 & 1 & T & 0 & 0 \\ 0 & 0 & 1 & 0 & 0 \\ 0 & 0 & 0 & 1 & T \\ 0 & 0 & 0 & 0 & 1 \end{pmatrix} \quad [19]$$

and $$Q = \sigma_\gamma^2 \begin{pmatrix} T^5/20 & T^4/8 & T^3/6 & 0 & 0 \\ T^4/8 & T^3/3 & T^2/2 & 0 & 0 \\ T^3/6 & T^2/2 & T & 0 & 0 \\ 0 & 0 & 0 & 0 & 0 \\ 0 & 0 & 0 & 0 & 0 \end{pmatrix} + \sigma_\omega^2 \begin{pmatrix} 0 & 0 & 0 & 0 & 0 \\ 0 & 0 & 0 & 0 & 0 \\ 0 & 0 & 0 & 0 & 0 \\ 0 & 0 & 0 & T^3/3 & T^2/2 \\ 0 & 0 & 0 & T^2/2 & T \end{pmatrix} \quad [20]$$

for a given merged blip $p_k$, the measurements delivered at the instant k by the processing chain (observation variable) are, as stated previously, collected together in the vector $y_k = [r_{b,k} \ v_{b,k} \ \theta_k]'$ representing this blip. They are affected by an error modeled by a centered Gaussian white noise $\{v_k\}$, of covariance matrix $R_k$:

$$R_k = \begin{pmatrix} \sigma_{r_{b,k}}^2 & 0 & 0 \\ 0 & \sigma_{r_{b,k}}^2 & 0 \\ 0 & 0 & \sigma_{\theta_k}^2 \end{pmatrix}. \quad [21]$$

Consequently, the observation equation, modeling the sensor, is expressed as follows:

$$y_k = Hx_k + v_k \quad [22]$$

with $$H = \begin{pmatrix} 1 & 0 & 0 & 0 & 0 \\ 0 & 1 & 0 & 0 & 0 \\ 0 & 0 & 0 & 1 & 0 \end{pmatrix}.$$

At each instant k, the estimated state of the target will therefore be characterized by the first two moments of the process $\{x_k\}$, its conditional average $\hat{x}_k$ and its conditional covariance $\hat{\Sigma}_{x_k}$, defined by:

$$\hat{x}_k = E[x_k | Y^k] \quad [23]$$

and $$\hat{\Sigma}_{x_k} = E[(x_k - \hat{x}_k)(x_k - \hat{x}_k)' | Y^k] \quad [24]$$

with $Y^k = \{y_j\}_{j=1,\ldots,k}$.

It will be noted that E here represents the mathematical expectation.

Because of the linearity of the models, the Gaussian nature of the additive noises and hypothesizing Gaussian initial conditions for the state, the optimum filter for the estimation of the state of a target therefore corresponds to the Kalman filter defined as follows:

Predicted state: $\tilde{x}_k = E[x_k | Y^{k-1}] = F\hat{x}_{k-1}$ [25]

Predicted covariance:

$$\tilde{\Sigma}_{x_k} = E[(x_k - \tilde{x}_k)(x_k - \tilde{x}_k) | Y^{k-1}] \quad [26]$$
$$= F\hat{\Sigma}_{x_{k-1}}F' + Q$$

Innovation: $i_k = y_k - H\tilde{x}_k$ [27]

Covariance of the innovation: $\Sigma_{i_k} = H\tilde{\Sigma}_{x_k}H' + R_k$ [28]

Kalman gain: $K_k = \tilde{\Sigma}_{x_k}H\Sigma_{i_k}^{-1}$ [29]

Estimated state: $\hat{x}_k + \tilde{x}_k + K_k i_k$ [30]

Covariance of the estimated state: $\hat{\Sigma}_{x_k} = (I - K_k H)\tilde{\Sigma}_{x_k}$ [31]

The implementation of such a filter thus makes it possible to determine, from the estimated state of an individual track at the instant k−1, the predicted state of this track for the instant k, the predicted measurement for the corresponding target. This measurement will be supplied to the module 43 which will perform, at the time k, the association of the merged blips with existing individual tracks. This predicted measurement makes it possible to determine whether a merged blip available at the instant k can be associated with an existing individual track. If such is the case, this blip will be used to estimate the state of the individual track concerned at the instant k.

Given the hypothesis that no observation, that is to say no merged blip, can be associated with a given individual track, the latter is then taken over in a pure prediction mode, for which the state of a track at the instant k is now determined only by the trend equation of the dynamic range:

Predicted state: $\tilde{x}_k = F\hat{x}_{k-1}$

Predicted covariance: $\tilde{\Sigma}_{x_k} = F\hat{\Sigma}_{x_{k-1}}F' + Q$

This type of take-over ceases immediately a new association is possible at a given instant k or else ceases by the track being abandoned by the system (score too low). The management module 41 also implements a cleaning operation consisting in eliminating the tracks that are not maintained or are aberrant.

The step 222 for forming individual tracks therefore makes it possible to associate over time merged blips produced by the various channels relating to one and the same bistatic base. It results in the generation and the maintaining of a table of individual tracks, a table which notably contains, for each track, its number, the value at the given instant of the state vector of the track, and the score which is attributed to it and which reflects the likelihood of the track. According to the invention, this table is re-updated on each iteration, that is to say, for each new measurement instant k. The data updated are used by the following step 24 to initialize and maintain global tracks.

Figure 6:
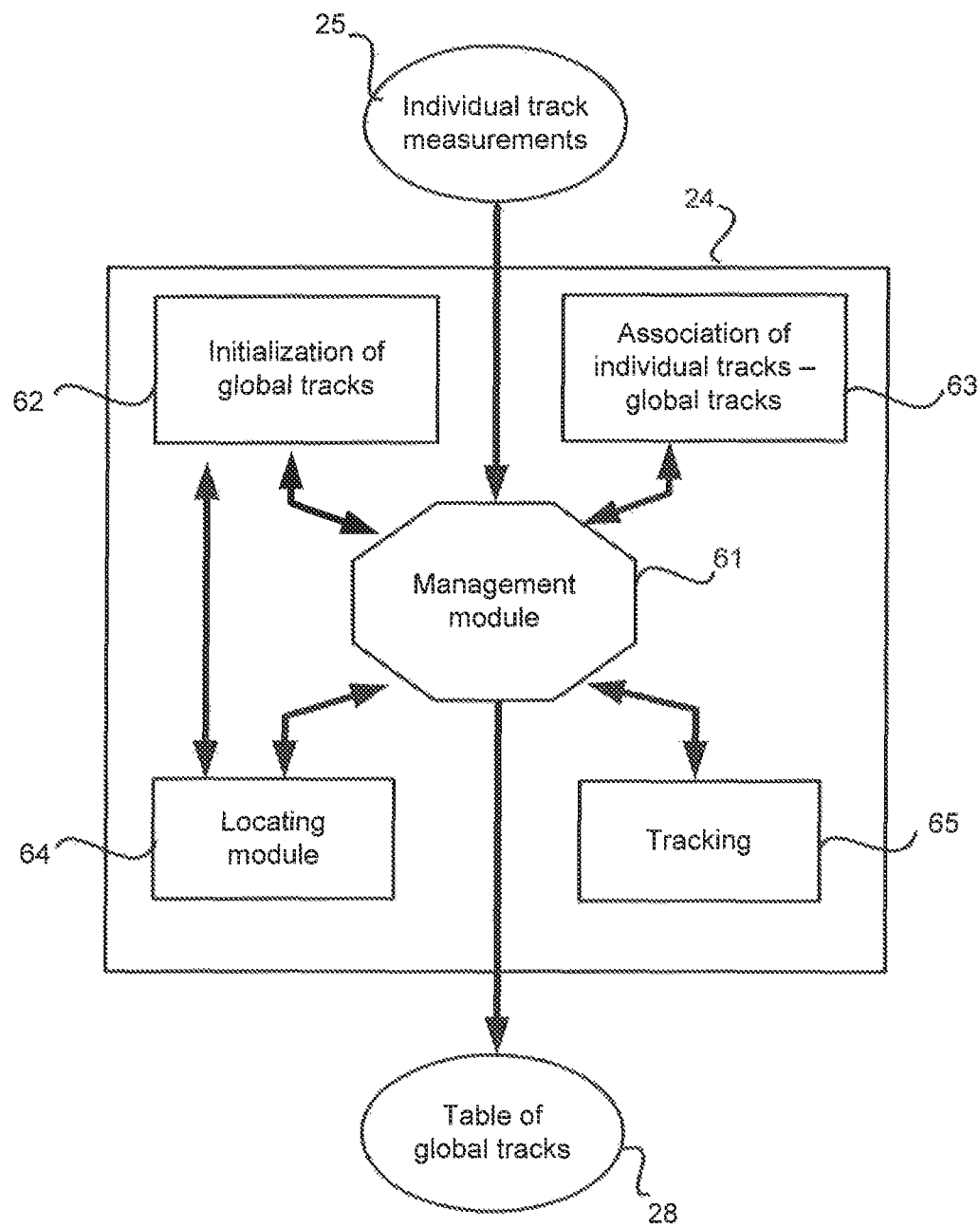
FIG. 6, a general block diagram of the downstream merging step of the method according to the invention.
Figure 7:
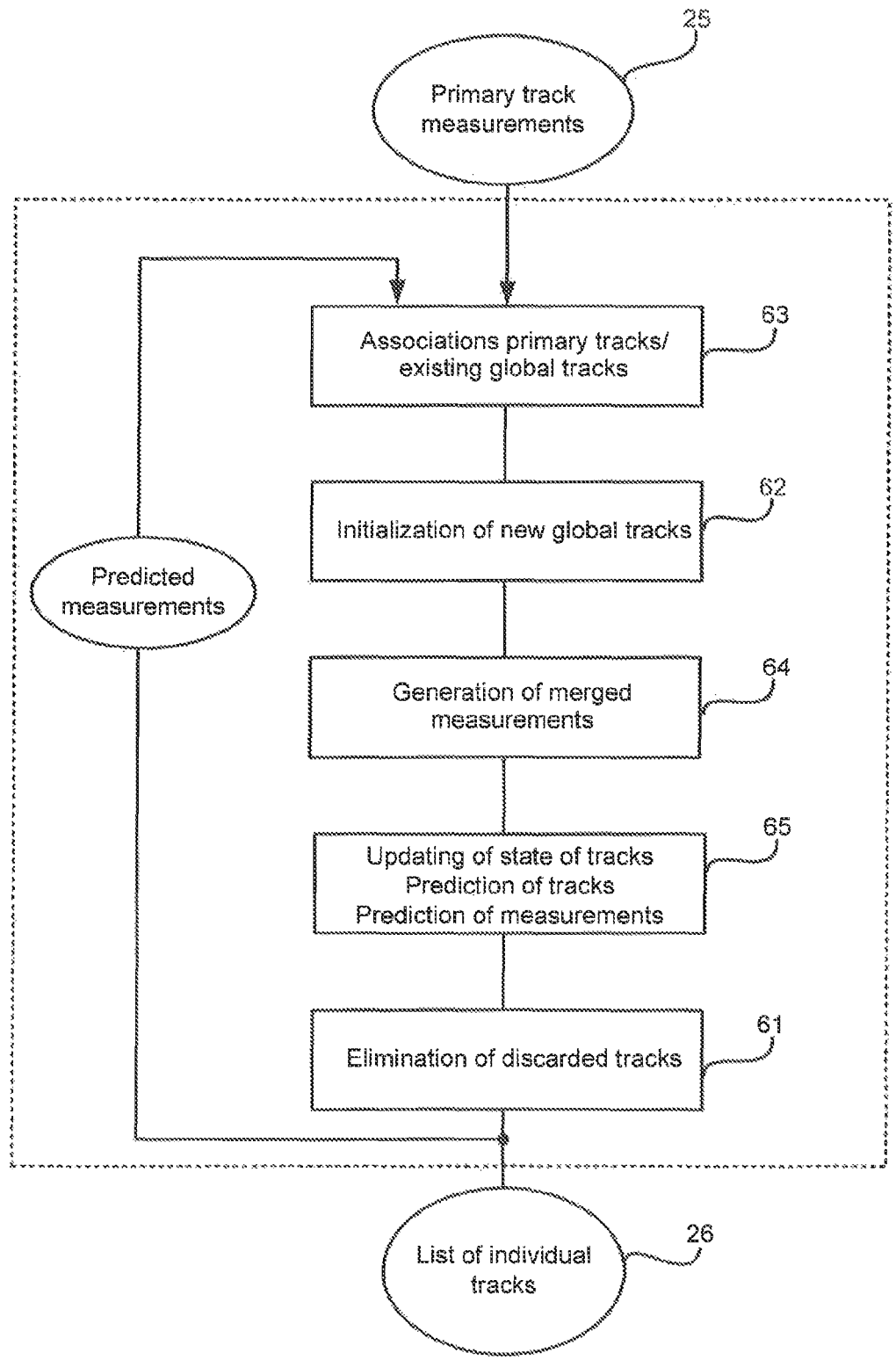
FIG. 7, a block diagram of the sequencing of the downstream merging step.

FIGS. 6 and 7 illustrate the principle of operation of the downstream merging step 24 forming the second step of the method according to the invention. The downstream merging step 24 is responsible for merging all the individual tracks generated in the upstream merging step 23, individual tracks attached to each of the bistatic bases. The aim is to produce relevant information concerning the aerial situation surrounding the radar. During this step, which constitutes the core of the data processing, the following actions are carried out:

associating the individual tracks produced by the various bistatic bases to search for and select, from all the possible inter-base associations of individual tracks, the most likely individual track associations. The most likely associations are those which result in the formation of a global track that really corresponds to a target;

merging the measurements relating to the associated individual tracks to construct pseudo-measurements relating to the global tracks maintained;

keeping the state of the global tracks formed updated and supporting it in pace with the appearances/disappearances of the contributing individual tracks. The block diagram of FIG. 6 shows the organization of the various processing modules implemented by the downstream merging step.

The downstream merging processing architecture is derived from the known architectures of multi-target/multi-sensor trackers. The following modules are mainly variousiated therein:

a module 62 for initializing global tracks, responsible for proceeding to create global tracks by reviewing all the possible associations of individual tracks, and for identifying the most likely associations;

a module 63 for associating individual tracks and global tracks, responsible for associating blips forming individual tracks with the global tracks and, where appropriate, attaching new individual tracks to an existing global track;

a locating module 64, responsible for estimating, on the basis of the bistatic distance measurements relating to the individual tracks associated with the global track concerned, the position of the target in the reference Cartesian coordinate system;

a tracking module 65, responsible for estimating the position and the speed (i.e. the state) of the target in light of an observation vector and of a dynamic target model;

a management module 61, responsible for sequencing the implementation of the various modules and proceeding, on each iteration, to clean the dead and/or aberrant global tracks.

The overall sequencing of the downstream merging phase, illustrated by FIG. 7, is performed by the management module 61. It mainly consists, conventionally, in iteratively linking together the tasks performed by the modules 62, 63 and 64 in step with the instants k of generation of the merged blips forming the individual tracks.

According to the invention, the management module 61 is also responsible for generating and maintaining the table of global tracks. To this end, it attributes a number to each global merged track formed. This number is attributed to the track concerned for the duration of its existence. It also proceeds to attribute a score (likelihood level) to each of the global tracks maintained. According to the invention, the score attributed to a global track corresponds, for example, to the sum of the scores of the individual tracks contributing to its maintenance. Consequently, the disappearance of all of the individual tracks feeding a global track results in a cancellation of the score for the global track concerned and in the implementation of a new pure prediction procedure concerning the state of this track. Beyond a certain number of iterations without the score being improved, the global track is abandoned and the management module eliminates it from the table of global tracks. Its number is then available to be attributed to a track formed subsequently.

The initialization module 62 uses the tracks in the list of individual tracks that have not yet been the subject of an association with a global track, or else those which, having been excluded from a prior association, have not been able to be associated with any other existing global track. As stated previously, any global track is initialized by the association of two individual tracks generated from two distinct bistatic bases.

According to the invention, the initialization of a global track breaks down into five steps performed in the following order:

first step: test of the azimuth consistency of the association-candidate individual tracks;

second step: test of the distance consistency of the candidate individual tracks;

third step: test of the speed consistency of the candidate individual tracks;

fourth step: initialization of a global track;

fifth step: extension of the number of contributing individual tracks (i.e. the number of bistatic bases) of the newly created global track.

The tests of the first three steps are performed on the blips representing the state of the individual tracks concerned at a given instant k. These three steps are carried out sequentially, the transition from one step to the next being conditional on the success of the test associated with the current step. Together they constitute the association likelihood test, a test whose result conditions the execution of the fourth and the fifth steps.

According to the invention, the first step uses the azimuth consistency of the candidate individual tracks. It implements a first test (test No. 1) which consists in calculating the azimuth deviation ($|\theta_{P_{Txi}} - \theta_{P_{Txj}}|$) between the end blips, at the instant k, of the two candidate individual tracks $P_{Txi}$ and $P_{Txj}$. If this deviation is greater than a fixed value, the initialization procedure is stopped, otherwise the next step is carried out. This first test makes it possible to instantaneously eliminate the association attempts that are without substance (unlikely associations).

According to the invention, the second step analyses the distance consistency of the association-candidate tracks. It implements a second test (test No. 2) to determine the likelihood of the association envisaged. This second step which locates these two blips on the basis of the bistatic azimuths and distances, is divided into two parts:

The first part consists in quickly checking whether the two ellipsoids associated with the two individual tracks intersect in the angular segment corresponding to their mean azimuth and, if they do, what is the position (x,y,z) of this intersection.

This check consists, assuming coplanar transmitter and receiver, in finding, if it exists, the solution to the system:

$$\frac{R_b^{P_{Txi}^2} - L_i^2}{2\left(R_b^{P_{Txi}} - L_i \cos(\tilde{\theta} - \theta_i)\cos(\phi)\right)} - \frac{R_b^{P_{Txj}^2} - L_j^2}{2\left(R_b^{P_{Txj}} - L_j \cos(\tilde{\theta} - \theta_j)\cos(\phi)\right)} = 0 \quad [32]$$

in which ($R_b^{P_{Txi}}, R_b^{P_{Txj}}$) represents the bistatic distances of the end blips of the candidate individual tracks $P_{Txi}$ and $P_{Txj}$, $\tilde{\theta}$ the mean azimuth of these blips, ($L_i, L_j$) the transmitter-receiver distances of the bistatic bases from which the candidate individual tracks are derived and ($\theta_i, \theta_j$) the azimuths under which the transmitters of the same bistatic bases are seen by the receivers.

The solution to this system is expressed as follows:

$$\cos(\phi) = \frac{2\cdot\left(R_b^{P_{Txi}^2}-L_i^2\right)\cdot R_b^{P_{Txj}} - 2\cdot\left(R_b^{P_{Txj}^2}-L_j^2\right)\cdot R_b^{P_{Txi}}}{2\left(R_b^{P_{Txi}^2}-L_i^2\right)\cdot L_j\cdot\cos(\tilde{\theta}-\theta_j) - 2\cdot\left(R_b^{P_{Txj}^2}-L_j^2\right)\cdot L_j\cos(\tilde{\theta}-\theta_i)} \quad [33]$$

Consequently, a first estimation of the location of the target is given by:

$$\begin{cases} x = \rho\cdot\cos(\tilde{\theta})\cdot\cos(\varphi) \\ y = \rho\cdot\sin(\tilde{\theta})\cdot\cos(\varphi) \\ z = \rho\cdot\sin(\varphi) \end{cases} \quad [34]$$

in which $$\rho = \frac{\left(R_b^{P_{Txi}^2}-L_i^2\right)\cdot L_j\cdot\cos(\tilde{\theta}-\theta_j) - \left(R_b^{P_{Txj}^2}-L_j^2\right)\cdot L_i\cdot\cos(\tilde{\theta}-\theta_i)}{2\cdot R_b^{P_{Txi}}\cdot L_j\cdot\cos(\tilde{\theta}-\theta_j) - 2\cdot R_b^{P_{Txj}}\cdot L_i\cos(\tilde{\theta}-\theta_i)} \quad [35]$$

The second part consists in characterizing, by its position, the location area corresponding to the area of intersection of the two ellipsoids (area corresponding to the probable positions of the target). For this, the method described in the French patent application No. 06 10961 filed by the applicant on 15 Dec. 2006 is, for example, applied. This method returns a list of contiguous blocks describing, if it exists, the area of intersection of the location ellipsoids used, as is known, to finely locate the target in the bistatic radar systems. Each block corresponds to a parallelepiped characterized by the position of its center and the width of each of its sides, the union of these blocks encompassing the area of intersection.

The set of these blocks is here used to represent this area by a mean position and by a covariance matrix. These two quantities are evaluated as follows:

According to the invention, the probability of each of the solution blocks obtained is evaluated by applying the method described in the patent application cited previously, by correlating the measurements of the bistatic distances derived from the individual tracks and the projection of the center of the block in the bistatic bases corresponding to the measurements (i.e., to the individual tracks). If $x^m$ is used to denote the position, in the reference coordinate system, of the center of a block m forming a solution, its bistatic distance in the bistatic base associated with the first track is expressed as follows:

$$r_b^{i,m} = \|x^m - x^{Txi}\|_2 + \|x^m - x^{Rx}\| \quad [36]$$

Using $$\left(\tilde{r}_b^{i,m}, \sigma_{r_b^{i,m}}\right)$$

to denote the bistatic distance associated with the blip of the track $P_{Txi}$ and its standard deviation, the probability of the block m belonging to the bistatic distance measurement in the base i is taken to be equal to $$P_{r_b^{i,m}} = 1 - \mathrm{Erf}\left(\frac{|\tilde{r}_b^{i,m}-r_b^{i,m}|}{\sigma_{r_b^{i,m}}\sqrt{2}}\right) \quad [37]$$

in which Erf corresponds to the conventional Gaussian Error function:

$$\mathrm{Erf}(x) = \frac{1}{\sqrt{\pi}}\int_0^x e^{-t^2}dt. \quad [38]$$

This probability calculation is iterated on all the blocks and on all the bistatic bases (here two). Using $N_p$ to denote the total number of blocks, the final probability of the block m is obtained as follows:

$$P^m = \frac{P_{r_b^{i,m}}\cdot P_{r_b^{j,m}}}{\sum_{k=1}^{N_p} P_{r_b^{i,k}}\cdot P_{r_b^{j,k}}}. \quad [39]$$

The area of uncertainty is, according to the invention, characterized by its mean and its covariance matrix, calculated as follows from the preceding probabilities:

$$\bar{x} = \sum_{k=1}^{N_p} P^k x^k \quad [41]$$

and $$\Sigma_x = \sum_{k=1}^{N_p} P^k(x^k-\bar{x})(x^k-\bar{x}) = \begin{pmatrix} \sigma_{xx}^2 & \sigma_{xy}^2 & \sigma_{xz}^2 \\ \sigma_{xy}^2 & \sigma_{yy}^2 & \sigma_{yz}^2 \\ \sigma_{xz}^2 & \sigma_{yz}^2 & \sigma_{zz}^2 \end{pmatrix} \quad [41]$$

In the favorable hypothesis in which the association is considered to be likely, the third step of the association module is undertaken.

The speed consistency test implemented during this third step is used to confirm the test results of the preceding step. It consists in determining, assuming that the two individual tracks concerned are linked to the same target, the speed of the latter, a speed that is expressed by its components $v_x$ and $v_y$ in the reference Cartesian coordinate system linked to the radar (i.e. to the receiver).

The speed component $v_z$ is here not considered given that, for most targets, the ascentional speed is negligible relative to the other components and its determination entails processing the information generated not by two, but three distinct bistatic bases, which often unnecessarily complicates the calculations.

The determination of the assumed speed of the target thus consists, according to the invention, in resolving the following linear system:

$$\begin{cases} v_b^i = f_{T_x^i}([x^t v_x^t y^t v_y^t]) \\ v_b^j = f_{T_x^j}([x^t v_x^t y^t v_y^t]) \end{cases} \approx \begin{bmatrix} v_b^i \\ v_b^j \end{bmatrix} = A^{x^t,y^t}_{T_x^i,T_x^j}\begin{bmatrix} v_x^t \\ v_y^t \end{bmatrix} \quad [42]$$

with

-continued $$A_{T_x^i,T_x^j}^{x^t,y^t} = \begin{pmatrix} \dfrac{x^t - x_c^{T_c^i}}{\|x^t - x_c^{T_c^i}\|_2} + \dfrac{x^t - x^{R_x}}{\|x^t - x^{R_x}\|_2} & \dfrac{y^t - t_c^{T_c^i}}{\|y^t - y^{T_c^i}\|_2} + \dfrac{y^t - y^{R_x}}{\|y^t - y^{R_x}\|_2} \\ \dfrac{x^t - x_c^{T_c^j}}{\|x^t - x_c^{T_c^j}\|_2} + \dfrac{x^t - x^{R_x}}{\|x^t - x^{R_x}\|_2} & \dfrac{y^t - y_c^{T_c^j}}{\|y^t - y^{T_c^j}\|_2} + \dfrac{y^t - y^{R_x}}{\|y^t - y^{R_x}\|_2} \end{pmatrix} \quad [43]$$

and in which $x^t$ and $y^t$ represent the coordinates of the system obtained on completion of test No. 2 of the preceding step. The unknowns of the system are here the values $v_x^t$ and $v_y^t$ of the Cartesian components of the speed vector of the target.

Consequently, the consistency test consists in determining whether the modulus of this assumed speed is less than a given maximum speed. If it is, the likelihood of the association of the two individual tracks is confirmed. Otherwise, the association is abandoned.

In the favorable hypothesis in which the association is considered to be confirmed, the fourth step of the initialization module 62 is undertaken (initialization of a global track). The initial state of the global merged track is then represented by a mean quantity $x_{init}$ and a covariance matrix $\Sigma_{x_{init}}$ constructed from the results obtained on completion of the second and third steps. The following can be written:

$$x_{init} = [x^t \, v_{x^t} \, y^t \, v_{y^t} \, z^t \, 0]' \quad [44]$$

and $$\Sigma_{x_{init}} = \begin{pmatrix} \sigma_{x^t x^t}^2 & 0 & \sigma_{x^t y^t}^2 & 0 & \sigma_{x^t z^t}^2 & 0 \\ 0 & \sigma_{v_{x^t}}^2 & 0 & \sigma_{v_{y^t},v_{x^t}}^2 & 0 & 0 \\ \sigma_{x^t y^t}^2 & 0 & \sigma_{y^t y^t}^2 & 0 & \sigma_{y^t z^t}^2 & 0 \\ 0 & \sigma_{v_{y^t},v_{x^t}}^2 & 0 & \sigma_{v_{y^t}}^2 & 0 & 0 \\ \sigma_{x^t z^t}^2 & 0 & \sigma_{y^t z^t}^2 & 0 & \sigma_{z^t z^t}^2 & 0 \\ 0 & 0 & 0 & 0 & 0 & \sigma_{v_{z^t}}^2 \end{pmatrix} \quad [45]$$

in which:

$$\begin{pmatrix} \sigma_{v_{x^t}}^2 & \sigma_{v_{y^t},v_{x^t}}^2 \\ \sigma_{v_{y^t},v_{x^r}}^2 & \sigma_{v_{y^t}}^2 \end{pmatrix} = \left(A_{T_x^i,T_x^j}^{x^t,y^t}\right)^{-1} \begin{pmatrix} \sigma_{v_b^i}^2 & 0 \\ 0 & \sigma_{v_b^j}^2 \end{pmatrix} \left(\left(A_{T_x^i,T_x^j}^{x^t,y^t}\right)^{-1}\right)' \quad [46]$$

with $$\sigma_{v_z^t}^2 = \text{constant.}$$

The fourth step of the initialization module 62 is finally followed by the fifth and last step which consists in trying to aggregate with the global track other individual tracks coming from the bistatic bases that did not contribute to the initialization of the newly created global track (N−2 bases for a total set of N bases). The process of associating individual tracks-global tracks implemented at this stage is identical to the process implemented by the module 63. However, it concerns only the individual tracks for which an aggregation with a global track already formed (operation carried out by the module 63) has not been possible.

The "individual tracks-global tracks" association module 63, or association module, seeks on the one hand to confirm the likelihood of the associations already made and on the other hand to extend the number of bistatic bases that contribute to maintaining the current global tracks. To this end, the following three tasks are performed:

confirming, at the instant k concerned, that the individual tracks belong to the global tracks with which they were already associated at the instant k−1. If, at the instant k, the fact that a given individual track belongs to a global track is no longer proven, then the individual track is dissociated from the global track. It therefore becomes available, either for an association with another global track at the instant k, or, at the instant k+1, to form, with another individual track also not associated, a new global track (module 65);

looking to see if one or more new individual tracks, not yet associated, can be associated with existing global tracks;

looking to see if individual tracks can be associated with global tracks predicted over q cycles.

According to the invention, the operation to associate an individual track with a global track aims to widen the number of contributing bistatic bases. For this, a search is carried out among the individual tracks deriving from the bistatic bases that have not yet contributed to see if some could not be associated with the global track concerned by imposing, in the case where a number of candidate individual tracks would be identified, the choice of the most probable. The association process is iterated over all the global tracks currently being maintained. It is carried out as follows:

Loop on the bistatic bases (index b)
Search for the global tracks $\{gtrk_{\backslash b}\}$ that do not contain the base b.
End loop
Loop on the global tracks $\{gtrk_{\backslash b}\}$ (index i)
Loop on the individual tracks of the bistatic base under test (Index m)
Calculation of the statistical distances $Y_{i,m}$ (image of likelihood) between the global tracks retained and the individual tracks.
End loop on the individual tracks
End loop on the global tracks
Loop on the global tracks $\{gtrk_{\backslash b}\}$ (index i)
Loop on the individual tracks of the bistatic base under test (index m)
Search for the individual track $p_{etrk1}$ that is most likely (i.e. that minimizes a statistical distance while remaining below a maximum level):

$$Y_{ref} = \text{argmin}_{\{m\}}(Y_{i,m} < Y_{max}) = Y_{i,petrk2}$$

Search for the most likely individual track $p_{etrk2}$ after $p_{etrk1}$:

$$Y_{mem} = \text{argmin}_{\{m \neq petrk1\}}(Y_{i,m} \leq Y_{max}) = Y_{i,petrk2}.$$

End loop on the individual tracks
If $p_{etrk1}$ and $p_{etrk2}$ do not exist then go to the next index i.
End if
If $p_{etrk1}$ exists but not $p_{etrk2}$, then the association exists. The association between the individual track $p_{etrk1}$ and the global track i is pronounced.
End if
If petrk1 and petrk2 exist then:
Loop on the global tracks excluding track i (index n)
Search to see if a global track would not have a likelihood with the individual track $p_{etrk1}$ that is greater than the track i. This test amounts to checking whether there is an index $n_{inv}$ such that $Y_{n_{inv},p_{etrk}} \geq Y_{i,p_{etrk1}}$.
End loop on the global tracks
If no index $n_{inv}$ has been found, the association between the individual track $p_{etrk1}$ and the global track i is pronounced.

Else, the association between the individual track $p_{etrk2}$ and the global track i is pronounced.

End if

If an index $n_{inv}$ has been found, the association between the individual track petrk1 and the global track i is invalidated.

End if

End loop on the individual tracks

The calculation of the statistical distance γ between a global track i and an individual track j of a base b is obtained as follows by projecting the global track in the bistatic base b:

Let g be the transition functional (explained in equation [48]) from the Cartesian coordinates X of the coordinate system $(R_x, x, y, z)$ to the bistatic coordinates Y of the bistatic base b, in which $X=[x\ v_x\ y\ v_y\ z\ v_z]'$ and $Y=[r_b\ v_b\ \theta]'$. If $(\tilde{x}_k, \tilde{\Sigma}_{x_k})$ respectively represent the prediction of the state of the global track at the instant k and its covariance, then its projection in the bistatic base is expressed as $\tilde{y}_k = g(\tilde{x}_k)$ with:

$$g\left(\begin{bmatrix} x_k \\ v_{x,k} \\ y_k \\ v_{y,k} \\ z_k \\ v_{z,k} \end{bmatrix}\right) = \left[((x_k - x^{T_x})^2 + (y_k - y^{T_x})^2 + (z_k - z^{T_x})^2)^{1/2} + \right. \quad [47]$$

$$((x_k - x^{R_x})^2 + (y_k - y^{R_x})^2 + (z_k - z^{R_x})^2)^{1/2}$$

$$\frac{(x_k - x^{T_x})v_{x,k} + (y_k - y^{T_x})v_{y,k} + (z_k - z^{T_x})v_{z,k}}{((x_k - x^{T_x})^2 + (y_k - y^{T_x})^2 + (z_k - z^{T_x})^2)^{1/2}} +$$

$$\frac{(x_k - x^{R_x})v_{x,k} + (y_k - y^{R_x})v_{y,k} + (z_k - z^{R_x})v_{z,k}}{((x_k - x^{R_x})^2 + (y_k - y^{R_x})^2 + (z_k - z^{R_x})^2)^{1/2}}$$

$$\left. \mathrm{atan}\left(\frac{y_k - y^{R_x}}{x_k - x^{R_x}}\right) \right]$$

By using $(Y_k, R_k)$ to denote the state of the individual track (restricted to the three bistatic components $r_b$, $v_b$ and θ described previously) and its covariance, the statistical distance γ is obtained as follows:

$$\gamma v_k' \lceil_k^{-1} v_k \quad [48]$$

with $v_k = Y_k - g(\tilde{x}_k)$ and $\lceil_k = G_k \tilde{\Sigma}_{x_k} G_k' + R_k$, $G_k$ corresponding to the linearization of g at $$\tilde{x}_k: G_k = \left.\frac{\partial g}{\partial x}\right|_{x=\tilde{x}_k}.$$

The initialization 62 and association 63 operations having been performed, the locating module 64 according to the invention proceeds to locate the global tracks. Depending on the case, they may be newly formed global tracks based on the state of the individual tracks at the instant k concerned or else preexisting global tracks, and whose existence is confirmed by the state of the individual tracks at that instant. It can be used to construct the position observations which are used by the tracking module 65 to maintain the global tracks. The observation vector contains, on the one hand, the result of the merging of the bistatic distances extracted from the individual tracks and, on the other hand, the bistatic speeds extracted from these same individual tracks.

According to the invention, the merging of the bistatic distances, supplied in the state of the individual tracks, is performed by reconstructing the position of the target from a number of bistatic distances deriving from the various transmitter/receiver pairs. This reconstruction can be done by any known appropriate method, in particular by the method implemented in the global track initialization module 62, for the distance consistency test performed by the second step (second part); the method here being extended to the number of individual tracks involved at the instant k in the global track for which the observation vector is to be constructed.

The observation vector is then defined as follows:

$$y_{gt} = [x_f\ y_f\ z_f\ v_b^{et1}\ v_b^{et2}\ \ldots\ v_b^{etm}]' \quad [49]$$

and $$R_{y_{gt}} = \begin{pmatrix} \sigma_{x_f}^2 & \sigma_{x_f y_f}^2 & \sigma_{x_f z_f}^2 & 0 & 0 & \ldots & 0 \\ \sigma_{x_f y_f}^2 & \sigma_{y_f}^2 & \sigma_{y_f z_f}^2 & 0 & 0 & \ldots & 0 \\ \sigma_{x_f z_f}^2 & \sigma_{y_f z_f}^2 & \sigma_{z_f}^2 & 0 & 0 & \ldots & 0 \\ 0 & 0 & 0 & \sigma_{v_b^{et1}}^2 & 0 & \ldots & 0 \\ 0 & 0 & 0 & 0 & \sigma_{v_b^{et2}}^2 & \ldots & 0 \\ \vdots & \vdots & \vdots & \vdots & \vdots & \ddots & 0 \\ 0 & 0 & 0 & 0 & 0 & 0 & \sigma_{v_b^{etm}}^2 \end{pmatrix} \quad [50]$$

$R_{y_{gt}}$ representing the covariance of $y_{gt}$.

The parameters relating to the global tracks at the instant k concerned having been calculated, the tracking module 65 proceeds with the estimation of the state of the track, with its prediction at the instant k+1 and with the prediction of its associated measurement. The latter is intended to be used by the association module 63 to assess whether, at the instant k+1, a given individual track can be associated with an existing global track. It will be recalled here that, according to the invention, an individual track is associated, at a given instant k, only with a single global track.

According to the invention, the trend of the state of the target is modeled by a random process $\{x_k\}$ with value in $R^6$, describing the speed and the position of the target concerned, and the components of which are: $[x\ v_x\ y\ v_y\ z\ v_z]$.

This process is governed by the discrete time-linear trend equation corresponding to the following position/speed model:

$$x_k = F x_{k-1} + w_k \quad [51]$$

with $$F = \begin{bmatrix} 1 & T & 0 & 0 & 0 & 0 \\ 0 & 1 & 0 & 0 & 0 & 0 \\ 0 & 0 & 1 & T & 0 & 0 \\ 0 & 0 & 0 & 1 & 0 & 0 \\ 0 & 0 & 0 & 0 & 1 & T \\ 0 & 0 & 0 & 0 & 0 & 1 \end{bmatrix}$$

and in which the process $\{w_k\}$, with value in $R^6$, is a centered Gaussian white noise, of constant covariance matrix Q:

$$Q = \sigma_{v_{xy}}^2 \begin{pmatrix} T^3/3 & T^2/2 & 0 & 0 & 0 & 0 \\ T^2/2 & T & 0 & 0 & 0 & 0 \\ 0 & 0 & T^3/3 & T^2/2 & 0 & 0 \\ 0 & 0 & T^2/2 & T & 0 & 0 \\ 0 & 0 & 0 & 0 & 0 & 0 \\ 0 & 0 & 0 & 0 & 0 & 0 \end{pmatrix} +$$

$$\sigma_{v_z}^2 \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & T^3/3 & T^2/2 \\ 0 & 0 & 0 & 0 & T^2/2 & T \end{pmatrix}$$

in which T corresponds to the time deviation between the instants k and k+1.

The choice of this state model here is set by the nature of the priority targets of the radar.

The actual observation process groups together the merged position measurements expressed in the Cartesian coordinate system of the radar and the bistatic speed measurements deriving from each individual track contributing to the global track. The observation model is therefore nonlinear and with a variable dimension in time.

The observation process is also defined as a random process $\{y_k\}$ with value in $R^{3+nb\_cet}$, in which nb_cet represents the number of associated individual tracks (ter stands for "contributive elementary track"). This process of observation $\{y_k\}$ of components $[x\ y\ z\ v_b^{et1}\ v_b^{et2}\ ...\ v_b^{etn}]$ is defined by the observation equation:

$$y_k = h(x_k) + v_k \qquad [53]$$

in which $\{v_k\}$ is a Gaussian white noise for which the covariance matrix $R_k$ defined above (in the definition of the observation vector) corresponds to the accuracies of the measurements at the instant k, h here represents the observation functional of the trend process defined from $R^6$ to $R^{3+nb\_cet}$ as follows:

Consequently, the tracking module 65 according to the invention proceeds, for each measurement instant k, with the prediction of the components of the state vector corresponding to each global merged track based on the estimation of the components of the state vector at the instant k−1, this estimation itself being performed on the basis of the observation vector generated by means of the measurements relating, for the instant k−1, to the individual tracks associated with the global track concerned and the prediction of the components of the state vector at the instant k−1. The method implemented here is a recursive method described by an extended Kalman titer for which the definition equations are as follows:

Predicted state: $\tilde{x}_k = F\hat{x}_{k-1}$ [55]

Predicted covariance: $\tilde{\Sigma}_{x_k} = F\hat{\Sigma}_{x_{k-1}}F' + Q$ [56]

Linearization of the observation functional:

$$H_k = \frac{\partial h}{\partial x}\bigg|_{x=\tilde{x}_k} \qquad [57]$$

Innovation: $i_k = y_k - h(\tilde{x}_k)$ [58]

Covariance of the innovation: $\Sigma_{i_k} = H_k\tilde{\Sigma}_{x_k}H'_k + R_k$ [59]

Filtering gain: $K_k = \Sigma_{x_k}H_k\Sigma_{i_k}^{-1}$ [60]

Estimated state: $\hat{x}_k = \tilde{x}_k + K_k i_k$ [61]

Estimated covariance: $\hat{\Sigma}_{x_k} = (I - K_k H_k)\tilde{\Sigma}_{x_k}$ [62]

The initial state $(x_0, \Sigma_{x_0})$ here is assumed to be Gaussian.

On completion of the downstream merging step 24, there is therefore, for each measurement instant k, a list of global merged tracks, each track being characterized by the value of the state vector $x_k$ of the target to which it corresponds, this global track being fed by the measurements associated with the merged blips representing the various individual tracks obtained on completion of the upstream merging step 23 and associated with the global tracks concerned. The method according to the invention as described here therefore advantageously makes it possible to merge information originating from various bistatic bases, each bistatic base being able to process signals through various reception channels. This merging is advantageously made possible although the measurements performed by the various bistatic bases are not initially expressed in the same reference coordinate system.

$$h\left(\begin{bmatrix} x \\ y \\ z \\ v_b^{et1} \\ v_b^{et2} \\ \vdots \\ v_b^{etn} \end{bmatrix}\right) = \begin{pmatrix} x \\ y \\ z \\ \dfrac{(x-x_x^{Tet1})v_x + (y-y_x^{Tet1})v_y + (z-z_x^{Tet1})v_z}{((x-x_x^{Tet1})^2 + (y-y_x^{Tet1})^2 + (z-z_x^{Tet1})^2)^{1/2}} + \dfrac{(x-x^{R_x})v_x + (y-y^{R_x})v_y + (z-z^{R_x})v_z}{((x-x^{R_x})^2 + (y-y^{R_x})^2 + (z-z^{R_x})^2)^{1/2}} \\ \dfrac{(x-x_x^{Tet2})v_x + (y-y_x^{Tet2})v_y + (z-z_x^{Tet2})v_z}{((x-x_x^{Tet2})^2 + (y-y_x^{Tet2})^2 + (z-z_x^{Tet2})^2)^{1/2}} + \dfrac{(x-x^{R_x})v_x + (y-y^{R_x})v_y + (z-z^{R_x})v_z}{((x-x^{R_x})^2 + (y-y^{R_x})^2 + (z-z^{R_x})^2)^{1/2}} \\ \vdots \\ \dfrac{(x-x_x^{Tetn})v_x + (y-y_x^{Tetn})v_y + (z-z_x^{Tetn})v_z}{((x-x_x^{Tetn})^2 + (y-y_x^{Tetn})^2 + (z-z_x^{Tetn})^2)^{1/2}} + \dfrac{(x-x^{R_x})v_x + (y-y^{R_x})v_y + (z-z^{R_x})v_z}{((x-x^{R_x})^2 + (y-y^{R_x})^2 + (z-z^{R_x})^2)^{1/2}} \end{pmatrix} \qquad [54]$$

The invention claimed is:

1. A tracking method for multi-channel radar systems, the system comprising a receiver exploiting the transmissions of a number of utility transmitters, each transmitter forming with the receiver a bistatic base, the transmission produced by each of the transmitters exhibiting a spectrum consisting of different frequency whose treatment leads to each measurement instant in the creation of blips, each blip being characterized by a vector of three measurement constituted by a bistatic distance measurement, a bistatic speed measurement and an azimuth measurement, as well as a 3 ×3 diagonal matrix of the errors associated to these measurements, comprising:

a first upstream merging step; applied separately at each bistatic base, operating directly in the space of the components of the vectors characterizing the blips, and implementing an operation to form individual tracks, carrying the identification of the blips of different frequency channels relative to the same target and the instantaneous merging of these blips, the operation to form individual tracks comprising for each measurement instant:

a first blip merging substep for associating the individual blips of the various reception channels of each bistatic base which exhibit, for a given measurement instant, measurement vectors $y_j$ that are close to one another and forming merged blips, each merged blip j being characterized by a measurement vector $y_j = (r_b, v_b, \theta)$ where $r_b$, $v_b$ and $\theta$ respectively represent the bistatic distance measurement, the bistatic speed measurement and the azimuth measurement of the detected object by the considered bistatic base;

a second substep for constructing individual tracks from the merged blips, an individual track being formed by the succession over time of the merged blips relating to one and the same target, each detected target being represented by a bistatic individual track which characteristics change over time depending on blips associated to it;

the blip merging substep using a blip aggregation module which associates the individual blips of various reception channels of one and the same bistatic base which exhibit, for a given measurement instant, measurement vectors $y_j$ that are close to one another, taking the measurements accuracy into account, and forms merged blips, the aggregation of two individual blips $p_1$ and $p_2$ is achieved if the measurement vectors y1 and y2 characterizing these blips satisfy the proximity criterion defined by the following three relations:

$$\left[r_b^{p1} - 2\sigma_{r_b^{p1}}; r_b^{p1} + 2\sigma_{r_b^{p1}}\right] \cap \left[r_b^{p2} - 2\sigma_{r_b^{p2}}; r_b^{p2} + 2\sigma_{r_b^{p2}}\right] \neq \emptyset$$

and $$\left[v_b^{p1} - 2\sigma_{v_b^{p1}}; v_b^{p1} + 2\sigma_{v_b^{p1}}\right] \cap \left[v_b^{p2} - 2\sigma_{v_b^{p2}}; v_b^{p2} + 2\sigma_{v_b^{p2}}\right] \neq \emptyset$$

and $$\left[\theta^{p1} - 2\sigma_{\theta p1}; \theta^{p1} + 2\sigma_{\theta p1}\right] \cap \left[\theta^{p2} - 2\sigma_{\theta p2}; \theta^{p2} + 2\sigma_{\theta p2}\right] \neq \emptyset$$

in which $(\sigma_{r_b}^{p1}, \sigma_{v_b}^{p1}, \sigma_{\theta p1})$ and $(\sigma_{r_b}^{p2}, \sigma_{v_b}^{p2}, \sigma_{\theta p2})$, respectively represent the components of the covariance matrices R associated with the measurement vectors $y_j(r_b, v_b, \theta)$ of the blips concerned R being defined by $$R = \begin{pmatrix} \sigma_{r_b}^2 & 0 & 0 \\ 0 & \sigma_{v_b}^2 & 0 \\ 0 & 0 & \sigma_{\theta}^2 \end{pmatrix}$$

where $r_b$, $v_b$ and $\theta$ respectively represent the bistatic distance measurement, the bistatic speed measurement and the azimuth measurement characterizing the considered blip Pi;

a second downstream merging step generating a global track from individual tracks relating to one and the same target simultaneously detected by several bistatic bases, the second step implementing:

a module for initializing new global tracks, a new global track being initialized by combination of two individual tracks elaborated by two distinct bistatic bases a module to maintain the formed global tracks, the maintain being performed by research of individual tracks developed by other bistatic bases which may be associated with an existing global track, individual tracks that can be associated with a given global track being determined by projecting the attributes of the considered global track in each reference coordinate system of the bistatic bases in which no individual track have yet been associated to the considered global track and by comparison, for each of these bistatic bases, of the attribute values of the projected global track to the attributes of different individual tracks relative to the considered bistatic base; and a merging operation of bistatic information of the different merged individual tracks consisting, in a first time, to implement a localization module exploiting bistatic distances of individual tracks to determine an estimate of the position of the global track from ellipsoids corresponding these bistatic distances, then, in a second time, to implement a non-linear filtering module simultaneously exploiting the position estimation performed and bistatic speeds characterizing the individual tracks contributing to the maintain of the global track.

2. The method of claim 1, wherein the blip merging substep further comprises the following modules:

a module for merging the aggregated individual blips which generates, for each aggregate , a single resultant measurement vector $y(r_b, V_b, \theta)$ forming a merged blip, this measurement vector being made up from the measurement vectors yj of the aggregated individual blips, the merged blip being used to form a given individual track; and a module which checks the state of the individual tracks formed to determine the likelihood of an individual track considering the number of individual blips forming the aggregate from which the merged blip used to form the track originate.

3. The method of claim 1, wherein the blip merging substep further comprises the following modules:

a module for merging the aggregated individual blips which generates, for each aggregate, a single resultant measurement vector $y(r_b, V_b, \theta)$, from measurement vectors $y_j (r_b, V_b, \theta)$ of the blips forming the aggregate, y being defined by the following equalities:

$$y = R\sum_{j=1}^{N} R_j^{-1} y_j \text{ and } R = \left(\sum_{j=1}^{N} R_j^{-1}\right)^{-1}$$

in which $R_j$ represents the covariance matrix associated with the measurement vector $y_j$, the merged blip being used to form a given individual track;

a module which checks the state of the individual tracks formed to determine the likelihood of an individual track considering the number of individual blips forming the aggregate from which the merged blip used to form the track originate.

4. A tracking method for multi-channel radar systems, the system comprising a receiver exploiting the transmissions of a number of utility transmitters, each transmitter forming with the receiver a bistatic base, the transmission produced by each of the transmitters exhibiting a spectrum consisting of different frequency whose treatment leads to each measurement instant in the creation of blips, each blip being characterized by a vector of three measurement constituted by a bistatic distance measurement, a bistatic speed measurement and an azimuth measurement, as well as a 3×3 diagonal matrix of the errors associated to these measurements, comprising:

a first upstream merging step, applied separately at each bistatic base, operating directly in the space of the components of the vectors characterizing the blips, and implementing an operation to form individual tracks, carrying the identification of the blips of different frequency channels relative to the same target and the instantaneous merging of these blips, the operation to form individual tracks comprising for each measurement instant:

a first blip merging substep for associating the individual blips of the various reception channels of each bistatic base which exhibit, for a given measurement instant, measurement vectors $y_j$ that are close to one another and forming merged blips, each merged blip j being characterized by a measurement vector yj =(rb, vb, θ) where rb, vb and θ respectively represent the bistatic distance measurement, the bistatic speed measurement and the azimuth measurement of the detected object by the considered bistatic base;

a second substep for constructing individual tracks from the merged blips, an individual track being formed by the succession over time of the merged blips relating to one and the same target, each detected target being represented by a bistatic individual track which characteristics change over time depending on blips associated to it;

the blip merging substep using:

a first blip aggregation module which associates the individual blips of various reception channels of one and the same bistatic base which exhibit, for a given measurement instant, measurement vectors $y_j$ that are close to one another, taking the measurements accuracy into account, and forms merged blips, a second module for merging the aggregated individual blips which generates, for each aggregate, a single resultant measurement vector $y(r_b, V_b, \theta)$, from measurement vectors $y_j(r_b, V_b, \theta)$ of the blips forming the aggregate, y being defined by the following equalities:

$$y = R\sum_{j=1}^{N} R_j^{-1} y_i \text{ and } R = \left(\sum_{j=1}^{N} R_j^{-1}\right)^{-1}$$

in which $R_j$ represents the covariance matrix associated with the measurement vector $y_j$, the merged blip being used to form a given individual track;

a third module which checks the state of the individual tracks formed to determine the likelihood of an individual track considering the number of individual blips forming the aggregate from which the merged blip used to form the track originate;

a second downstream merging step generating a global track from individual tracks relating to one and the same target simultaneously detected by several bistatic bases, the second step implementing:

a module for initializing new global tracks, a new global track being initialized by combination of two individual tracks elaborated by two distinct bistatic bases a module to maintain the formed global tracks, the maintain being performed by research of individual tracks developed by other bistatic bases which may be associated with an existing global track, individual tracks that can be associated with a given global track being determined by projecting the attributes of the considered global track in each reference coordinate system of the bistatic bases in which no individual track have yet been associated to the considered global track and by comparison, for each of these bistatic bases, of the attribute values of the projected global track to the attributes of different individual tracks relative to the considered bistatic base;

a merging operation of bistatic information of the different merged individual tracks consisting, in a first time, to implement a localization module exploiting bistatic distances of individual tracks to determine an estimate of the position of the global track from ellipsoids corresponding these bistatic distances, then, in a second time, to implement a non-linear filtering module simultaneously exploiting the position estimation performed and bistatic speeds characterizing the individual tracks contributing to the maintain of the global track.

5. The method of claim 1, wherein the module for initializing new global tracks of the downstream merging step successively comprises the following five steps:

a first step which tests the azimuth consistency of the candidate individual tracks;

a second step which tests the distance consistency of the candidate individual tracks;

a third step which tests the speed consistency of the candidate individual tracks;

a fourth step which proceeds with the initialization of a global track;

a fifth step which consists in aggregating, with the initialized global track, individual tracks coming from the bistatic bases not involved in the initialization of the global track.

6. The method of claim 4, wherein the module for initializing new global tracks of the downstream merging step successively comprises the following five steps:

a first step which tests the azimuth consistency of the candidate individual tracks;

a second step which tests the distance consistency of the candidate individual tracks;

a third step which tests the speed consistency of the candidate individual tracks;

a fourth step which proceeds with the initialization of a global track;

a fifth step which consists in aggregating, with the initialized global track, individual tracks coming from the bistatic bases not involved in the initialization of the global track.

7. The method of claim 1, wherein the second downstream merging step consists in nearing the zone of intersection of the location ellipsoids by a juxtaposition of blocks, each block corresponding to a parallelepiped characterized by the position of its center and the width of each of its sides, the union of these blocks encompassing the area of intersection, and extracting from the set of blocks which include the area, an average position value and an associated covariance matrix, each block being associated with a probability characterizing its coherence with bistatic distances to the origin of the zone of intersection.

8. The method of claim 4, wherein the second downstream merging step consists in nearing the zone of intersection of the location ellipsoids by a juxtaposition of blocks, each block corresponding to a parallelepiped characterized by the position of its center and the width of each of its sides, the union of these blocks encompassing the area of intersection, and extracting from the set of blocks which include the area, an average position value and an associated covariance matrix, each block being associated with a probability characterizing its coherence with bistatic distances to the origin of the zone of intersection.

9. The method of claim 1, wherein the module to maintain the formed global tracks of the second downstream merging step implements the calculation of the statistical distance $\gamma$ separating the projection of a global track in a bistatic base b and an individual track of this same bistatic base b, candidate to the merging, the statistical distance $\gamma$ being function of the bistatic components, distance, speed and azimuth characterizing the association-candidate individual track and the components of the projection of the state x of the global track in the bistatic base b.

10. The method of claim 4, wherein the module to maintain the formed global tracks of the second downstream merging step implements the calculation of the statistical distance $\gamma$ separating the projection of a global track in a bistatic base b and an individual track of this same bistatic base b, candidate to the merging, the statistical distance $\gamma$ being function of the bistatic components, distance, speed and azimuth characterizing the association-candidate individual track and the components of the projection of the state x of the global track in the bistatic base b.

11. The method of claim 1, wherein the non-linear filtering module of the second downstream merging step proceeds, for each measurement instant k, with the prediction $\tilde{X}_k$ of the components of the state vector x corresponding to each global track based on the estimation $\hat{X}_{k-1}$ of the components of the state vector x at the instant k−1, this estimation itself being performed on the basis of the observation vector $Y_{k-1}$ generated by means of the measurements relating, for the instant k−1, to the individual tracks associated with the global track concerned and the prediction $\tilde{X}_{k-1}$ of the components of the state vector x at the instant k−1, the components of the observation vector consisting of the result of the merging of the bistatic distances of each individual track, generated in the locating module for the global tracks of the downstream merging step and for the bistatic speeds of the same individual tracks obtained on completion of the upstream merging step.

12. The method of claim 4, wherein the non-linear filtering module of the second downstream merging step proceeds, for each measurement instant k, with the prediction $\tilde{X}_k$ of the components of the state vector x corresponding to each global track based on the estimation $\hat{X}_{k-1}$ of the components of the state vector x at the instant k−1, this estimation itself being performed on the basis of the observation vector $Y_{k-1}$ generated by means of the measurements relating, for the instant k−1, to the individual tracks associated with the global track concerned and the prediction $\tilde{X}_{k-1}$ of the components of the state vector x at the instant k−1, the components of the observation vector consisting of the result of the merging of the bistatic distances of each individual track, generated in the locating module for the global tracks of the downstream merging step and for the bistatic speeds of the same individual tracks obtained on completion of the upstream merging step.

13. The method of claim 1, wherein the non-linear filtering module of the second downstream merging step proceeds, for each measurement instant k, with the prediction $\tilde{X}_k$ of the components of the state vector x corresponding to each global track based on the estimation $\hat{X}_{k-1}$ the components of the state vector x at the instant k−1, this estimation itself being performed on the basis of the observation vector $Y_{k-1}$ generated by means of the measurements relating, for the instant k−1, to the individual tracks associated with the global track concerned and the prediction $\tilde{X}_{k-1}$ of the components of the state vector x at the instant k−1, the components of the observation vector consisting of the result of the merging of the bistatic distances of each individual track, generated in the locating module for the global tracks of the downstream merging step and for the bistatic speeds of the same individual tracks obtained on completion of the upstream merging step, the estimation $\hat{X}_k$ and the prediction $\tilde{X}_{k-1}$ of the observation vector x being determined by means of an extended Kalman filter.

14. The method of claim 4, wherein the non-linear filtering module of the second downstream merging step proceeds, for each measurement instant k, with the prediction $\tilde{X}_k$ of the components of the state vector x corresponding to each global track based on the estimation $\hat{X}_{k-1}$ of the components of the state vector x at the instant k−1, this estimation itself being performed on the basis of the observation vector $Y_{k-1}$ generated by means of the measurements relating, for the instant k−1, to the individual tracks associated with the global track concerned and the prediction $\tilde{X}_{k-1}$ of the components of the state vector x at the instant k−1, the components of the observation vector consisting of the result of the merging of the bistatic distances of each individual track, generated in the locating module for the global tracks of the downstream merging step and for the bistatic speeds of the same individual tracks obtained on completion of the upstream merging step, the estimation $\hat{X}_k$ and the prediction $\tilde{X}_{k-1}$ of the observation vector x being determinated by means of an extended Kalman filter.

* * * * *